(12) United States Patent
McInerney et al.

(10) Patent No.: US 7,079,230 B1
(45) Date of Patent: Jul. 18, 2006

(54) PORTABLE AUTHENTICATION DEVICE AND METHOD OF AUTHENTICATING PRODUCTS OR PRODUCT PACKAGING

(75) Inventors: Henry F. McInerney, Essex, CT (US); Richard H. Selinfreund, Guilford, CT (US); Rakesh Vig, Durham, CT (US); Richard P. Gill, Ledyard, CT (US); Fred J. Behringer, Old Lyme, CT (US); J. Christopher Philips, Charlestown, RI (US); Jeffrey M. Drew, Branford, CT (US)

(73) Assignee: Sun Chemical B.V., Weesp (NL)

( * ) Notice: Subject to any disclaimer, the term of this patent is extended or adjusted under 35 U.S.C. 154(b) by 0 days.

(21) Appl. No.: 09/556,280

(22) Filed: Apr. 24, 2000

Related U.S. Application Data

(60) Provisional application No. 60/144,544, filed on Jul. 16, 1999, provisional application No. 60/193,158, filed on Mar. 28, 2000.

(51) Int. Cl.
*G01K 9/74* (2006.01)
(52) U.S. Cl. ...................................................... 356/71
(58) Field of Classification Search ................... 356/71
See application file for complete search history.

(56) References Cited

U.S. PATENT DOCUMENTS

| | | | |
|---|---|---|---|
| 1,822,098 A | 9/1931 | Huntress | |
| 2,265,196 A | 12/1941 | Riley | |
| 2,521,124 A | 9/1950 | Miller | |
| 3,356,462 A | 12/1967 | Cooke et al. | |
| 3,412,245 A | 11/1968 | Halverson | |
| 3,444,517 A | 5/1969 | Rabinow | |
| 3,473,027 A | 10/1969 | Freeman et al. | |
| 3,500,047 A | 3/1970 | Berry | |
| 3,533,744 A | 10/1970 | Unger | |
| 3,591,283 A | 7/1971 | Peisach | |
| 3,624,644 A | 11/1971 | Higgins | |

(Continued)

FOREIGN PATENT DOCUMENTS

DE          2 118 928          11/1971

(Continued)

OTHER PUBLICATIONS

1st Advanced Packaging Technology Conference held Nov. 9-11, 1998, downloaded from http://auburn.main.com/tse/imi/completed/advanced-pkg-euro.html; downloaded Jul. 1999.

(Continued)

*Primary Examiner*—Richard A. Rosenberger
(74) *Attorney, Agent, or Firm*—Wolf, Greenfield & Sacks, P.C.

(57) ABSTRACT

A portable authentication device and method of authenticating products or packaging by analyzing key ingredients on products or on product packaging is disclosed. Light-sensitive compounds can be used to identify the product or product packaging. The product or product package may include visible or invisible ink containing a particular light-sensitive compound. The ink may be printed in one or more locations on the product or product packaging to produce an authentication mark, such as a bar code. The device includes an assembly for providing a source of light to irradiate the ink containing the light-sensitive compound on the sample product or product package, an optical detector to detect certain spectral properties emitted or absorbed by the irradiated ink and a controller to determine the authenticity of the sample product or product package by comparing the emitted or absorbed properties to a standard.

54 Claims, 11 Drawing Sheets

U.S. PATENT DOCUMENTS

| | | |
|---|---|---|
| 3,649,464 A | 3/1972 | Freeman |
| 3,662,181 A | 5/1972 | Hercher et al. |
| 3,663,813 A * | 5/1972 | Shaw ................... 250/271 |
| 3,886,083 A | 5/1975 | Laxer |
| 3,928,226 A | 12/1975 | McDonough et al. |
| 3,992,158 A | 11/1976 | Przybylowicz et al. |
| 3,996,006 A | 12/1976 | Pagano |
| 4,015,131 A | 3/1977 | McDonough et al. |
| 4,018,643 A | 4/1977 | Levine |
| 4,038,151 A | 7/1977 | Fadler et al. |
| 4,053,433 A | 10/1977 | Lee |
| 4,077,845 A | 3/1978 | Johnson |
| 4,078,656 A | 3/1978 | Crane et al. |
| D248,044 S | 5/1978 | Odom, Jr. et al. |
| 4,087,332 A | 5/1978 | Hansen |
| 4,118,280 A | 10/1978 | Charles et al. |
| 4,120,402 A | 10/1978 | Swanson |
| 4,146,792 A * | 3/1979 | Stenzel et al. ............. 356/71 |
| 4,154,795 A | 5/1979 | Thorne |
| 4,171,918 A | 10/1979 | Mactaggart |
| 4,202,491 A * | 5/1980 | Suzuki ................... 235/491 |
| 4,225,242 A | 9/1980 | Lane |
| 4,235,964 A | 11/1980 | Bochner |
| 4,243,694 A | 1/1981 | Mansukhani |
| 4,244,741 A | 1/1981 | Kruse |
| 4,260,392 A | 4/1981 | Lee |
| 4,311,393 A | 1/1982 | Bartke |
| 4,329,317 A | 5/1982 | Detweiler et al. |
| 4,365,970 A | 12/1982 | Lawrence et al. |
| 4,382,064 A | 5/1983 | Detweiler et al. |
| 4,387,112 A | 6/1983 | Blach |
| 4,439,356 A | 3/1984 | Khanna et al. |
| 4,450,231 A | 5/1984 | Ozkan |
| 4,451,521 A | 5/1984 | Kaule et al. |
| 4,451,530 A | 5/1984 | Kaule et al. |
| 4,468,410 A | 8/1984 | Zeya |
| 4,485,308 A | 11/1984 | Rabatin |
| 4,486,536 A | 12/1984 | Baker et al. |
| 4,501,496 A | 2/1985 | Griffin |
| 4,514,085 A | 4/1985 | Kaye |
| 4,540,595 A | 9/1985 | Acitelli et al. |
| 4,557,900 A | 12/1985 | Heitzmann |
| 4,567,370 A * | 1/1986 | Falls ................... 250/461.1 |
| 4,589,551 A | 5/1986 | Hellon |
| 4,589,743 A | 5/1986 | Clegg |
| 4,598,205 A | 7/1986 | Kaule et al. |
| 4,620,776 A | 11/1986 | Ima |
| 4,631,174 A | 12/1986 | Kondo |
| 4,632,901 A | 12/1986 | Valkirs et al. |
| 4,642,526 A | 2/1987 | Hopkins |
| 4,736,425 A | 4/1988 | Jalon |
| 4,746,631 A | 5/1988 | Clagett |
| 4,756,557 A | 7/1988 | Kaule et al. |
| 4,767,205 A | 8/1988 | Schwartz et al. |
| 4,770,536 A | 9/1988 | Golberstein |
| 4,789,804 A | 12/1988 | Karube et al. |
| 4,806,316 A | 2/1989 | Johnson et al. |
| 4,818,677 A | 4/1989 | Hay-Kaufman et al. |
| 4,865,812 A | 9/1989 | Kuntz et al. |
| 4,882,195 A | 11/1989 | Butland |
| 4,889,365 A | 12/1989 | Chouinard |
| 4,897,173 A | 1/1990 | Nankai et al. |
| 4,921,280 A | 5/1990 | Jalon |
| 4,927,180 A | 5/1990 | Trundle et al. |
| 4,948,442 A | 8/1990 | Manns |
| 4,966,856 A | 10/1990 | Ito et al. |
| 4,983,817 A | 1/1991 | Dolash et al. |
| 5,005,873 A | 4/1991 | West |
| 5,018,866 A | 5/1991 | Osten |
| 5,030,421 A | 7/1991 | Muller |
| 5,030,832 A | 7/1991 | Williams et al. |
| 5,030,833 A | 7/1991 | Nozaka et al. |
| 5,039,490 A | 8/1991 | Marsoner et al. |
| 5,047,215 A | 9/1991 | Manns |
| 5,049,673 A | 9/1991 | Tsien et al. |
| 5,063,297 A | 11/1991 | Hardenbrook et al. |
| 5,093,147 A * | 3/1992 | Andrus et al. ................ 427/7 |
| 5,106,582 A | 4/1992 | Baker |
| 5,118,349 A | 6/1992 | Jalon |
| 5,128,243 A | 7/1992 | Potter et al. |
| 5,128,882 A | 7/1992 | Cooper et al. |
| 5,135,569 A | 8/1992 | Mathias |
| 5,139,812 A | 8/1992 | Lebacq |
| 5,147,042 A | 9/1992 | Levy |
| 5,150,425 A | 9/1992 | Martin et al. |
| 5,159,664 A | 10/1992 | Yamamoto et al. |
| 5,176,257 A | 1/1993 | Levy |
| 5,194,289 A | 3/1993 | Butland |
| 5,200,051 A | 4/1993 | Cozzette et al. |
| 5,204,914 A | 4/1993 | Mason et al. |
| 5,208,630 A | 5/1993 | Goodbrand et al. |
| 5,246,869 A | 9/1993 | Potter et al. |
| 5,260,032 A | 11/1993 | Muller |
| 5,264,103 A | 11/1993 | Yoshioka et al. |
| 5,272,090 A | 12/1993 | Gavish et al. |
| 5,279,967 A | 1/1994 | Bode |
| 5,282,894 A | 2/1994 | Albert et al. |
| 5,286,286 A | 2/1994 | Winnik et al. |
| 5,292,000 A | 3/1994 | Levy |
| 5,292,855 A | 3/1994 | Krutak et al. |
| 5,313,264 A | 5/1994 | Ivarsson et al. |
| 5,319,436 A | 6/1994 | Manns et al. |
| 5,321,261 A | 6/1994 | Valenta |
| 5,336,714 A | 8/1994 | Krutak et al. |
| 5,338,066 A | 8/1994 | Gundjian |
| 5,338,067 A | 8/1994 | Gundjian |
| 5,360,628 A | 11/1994 | Butland |
| 5,366,902 A | 11/1994 | Cox et al. |
| 5,409,583 A | 4/1995 | Yoshioka et al. |
| 5,409,666 A | 4/1995 | Nagel et al. |
| 5,414,262 A | 5/1995 | Filo |
| 5,418,855 A | 5/1995 | Liang et al. |
| 5,421,869 A | 6/1995 | Gundjian et al. |
| 5,424,959 A | 6/1995 | Reyes et al. |
| 5,429,952 A | 7/1995 | Garner et al. |
| 5,438,403 A | 8/1995 | Hoshino et al. |
| 5,450,190 A | 9/1995 | Schwartz et al. |
| 5,457,527 A | 10/1995 | Manns et al. |
| 5,468,650 A | 11/1995 | Skov et al. |
| 5,494,638 A | 2/1996 | Gullick |
| 5,496,701 A | 3/1996 | Pollard-Knight |
| 5,498,549 A | 3/1996 | Nagel et al. |
| 5,512,490 A | 4/1996 | Walt et al. |
| 5,516,362 A | 5/1996 | Gundjian et al. |
| 5,521,722 A | 5/1996 | Colvill et al. |
| 5,521,984 A | 5/1996 | Denenberg et al. |
| 5,525,516 A | 6/1996 | Krutak et al. |
| 5,545,567 A | 8/1996 | Gretillat et al. |
| 5,546,471 A | 8/1996 | Merjanian |
| 5,547,501 A | 8/1996 | Maruyama et al. |
| 5,568,177 A | 10/1996 | Talvalkar et al. |
| 5,569,317 A | 10/1996 | Sarada et al. |
| 5,574,790 A | 11/1996 | Liang et al. |
| 5,582,697 A | 12/1996 | Ikeda et al. |
| 5,589,350 A | 12/1996 | Bochner |
| 5,592,561 A | 1/1997 | Moore |
| 5,599,578 A | 2/1997 | Butland |
| 5,608,225 A | 3/1997 | Kamimura et al. |
| 5,611,433 A | 3/1997 | Levy |
| 5,614,008 A | 3/1997 | Escano et al. |
| 5,618,682 A | 4/1997 | Scheirer |
| 5,625,706 A | 4/1997 | Lee et al. |
| 5,631,170 A | 5/1997 | Attridge |
| 5,632,959 A | 5/1997 | Mohajer |

| | | |
|---|---|---|
| 5,641,640 A | 6/1997 | Hanning |
| 5,644,352 A | 7/1997 | Chang et al. |
| 5,650,062 A | 7/1997 | Ikeda et al. |
| 5,651,869 A | 7/1997 | Yoshioka et al. |
| 5,665,151 A | 9/1997 | Escano et al. |
| 5,666,417 A | 9/1997 | Liang et al. |
| 5,671,288 A | 9/1997 | Wilhelm et al. |
| 5,673,338 A | 9/1997 | Denenberg et al. |
| 5,710,626 A | 1/1998 | O'Rourke et al. |
| 5,711,915 A | 1/1998 | Siegmund et al. |
| 5,716,825 A | 2/1998 | Hancock et al. |
| 5,719,948 A * | 2/1998 | Liang .................. 382/112 |
| 5,728,350 A | 3/1998 | Kinoshita et al. |
| 5,736,342 A | 4/1998 | Van Wie et al. |
| 5,751,412 A | 5/1998 | Duell et al. |
| 5,753,511 A | 5/1998 | Selinfreund |
| 5,762,873 A | 6/1998 | Fanning et al. |
| 5,763,891 A * | 6/1998 | Yoshinaga et al. ....... 250/459.1 |
| 5,773,808 A | 6/1998 | Laser |
| 5,774,160 A | 6/1998 | Gundjian |
| 5,776,713 A | 7/1998 | Garner et al. |
| 5,784,193 A | 7/1998 | Ferguson |
| 5,786,182 A | 7/1998 | Catanzariti et al. |
| 5,786,509 A | 7/1998 | Belding et al. |
| 5,793,034 A | 8/1998 | Wesolowicz et al. |
| 5,800,785 A | 9/1998 | Bochner |
| 5,807,625 A | 9/1998 | Amon et al. |
| 5,811,152 A | 9/1998 | Cleary |
| 5,818,582 A | 10/1998 | Fernandez et al. |
| 5,822,473 A | 10/1998 | Magel et al. |
| 5,837,042 A | 11/1998 | Lent et al. |
| 5,851,489 A | 12/1998 | Wolf et al. |
| 5,856,174 A | 1/1999 | Lipshutz et al. |
| 5,861,618 A | 1/1999 | Berson |
| 5,867,586 A | 2/1999 | Liang et al. |
| 5,874,219 A | 2/1999 | Rava et al. |
| 5,895,073 A | 4/1999 | Moore |
| 5,917,925 A | 6/1999 | Moore |
| 5,919,712 A | 7/1999 | Herron et al. |
| 5,922,188 A | 7/1999 | Ikeda et al. |
| 5,922,550 A | 7/1999 | Everhart et al. |
| 5,922,591 A | 7/1999 | Anderson et al. |
| 5,922,594 A | 7/1999 | Löfås |
| 5,923,413 A | 7/1999 | Laskowski |
| 5,927,547 A | 7/1999 | Papen et al. |
| 5,939,024 A | 8/1999 | Robertson |
| D414,272 S | 9/1999 | O'Bear et al. |
| 5,955,352 A | 9/1999 | Inoue et al. |
| 5,955,729 A | 9/1999 | Nelson et al. |
| 5,961,926 A | 10/1999 | Kolb et al. |
| 5,966,205 A | 10/1999 | Jung et al. |
| 5,989,835 A | 11/1999 | Dunlay et al. |
| 5,998,128 A | 12/1999 | Roelant |
| 6,001,573 A | 12/1999 | Roelant |
| 6,005,960 A | 12/1999 | Moore |
| 6,032,860 A | 3/2000 | Brian |
| 6,203,069 B1 | 3/2001 | Outwater et al. |
| 6,246,778 B1 | 6/2001 | Moore |
| 6,297,508 B1 | 10/2001 | Barmore et al. |
| 6,456,729 B1 | 9/2002 | Moore |
| 6,473,524 B1 | 10/2002 | Reda et al. |
| 6,542,622 B1 | 4/2003 | Nelson et al. |
| 2001/0037455 A1 | 11/2001 | Lawandy et al. |
| 2003/0023557 A1 | 1/2003 | Moore |
| 2003/0112423 A1 | 6/2003 | Vig et al. |
| 2004/0000787 A1 | 1/2004 | Vig et al. |
| 2004/0023397 A1 | 2/2004 | Vig et al. |

FOREIGN PATENT DOCUMENTS

| | | |
|---|---|---|
| DE | 196 17 106 A1 | 10/1997 |
| EP | 0 016 339 A1 | 10/1980 |
| EP | 0 083 062 A2 | 7/1983 |
| EP | 0 327 163 A2 | 8/1989 |
| EP | 0485694 A2 | 5/1992 |
| EP | 0 589 991 B1 | 4/1994 |
| EP | 0 591 315 B1 | 4/1994 |
| EP | 0595583 A1 | 5/1994 |
| EP | 0 340 898 B1 | 9/1996 |
| EP | 0 736 767 A1 | 10/1996 |
| FR | 2 762 545 A1 | 10/1998 |
| FR | 2762545 A1 | 10/1998 |
| GB | 1 334 866 | 10/1973 |
| GB | 2 258 528 A | 2/1993 |
| GB | 2 298 713 B | 9/1996 |
| GB | 2 316 682 A | 3/1998 |
| GB | 2 334 574 A | 8/1999 |
| JP | 63184039 | 7/1988 |
| WO | WO 91/08556 | 6/1991 |
| WO | WO 95/06249 | 3/1995 |
| WO | WO 97/31332 | 8/1997 |
| WO | WO 97/50053 | 12/1997 |
| WO | WO 99/14055 | 3/1999 |

OTHER PUBLICATIONS

AOAC Official Methods of Analysis, 1900, pp. 752-754.

Amato, "Fomenting a Revolution, in Miniature," Science, vol. 282, pp. 402-404, Oct. 16, 1998.

Anslyn et al. "Rapid and Efficient Analysis of Multiple Chemical/Biochemical Agents in Solution Using Sensor Arrays: Toward the Development of an Electronic Tongue," The University of Texas at Austin, undated.

Barrett, "Molecular Fingerprinting of Food Bourne Pathogens," CDD IFT Symposium, Jun. 21-22, 1996.

Biacore Website, "Sensor chips for BIACORE analysis systems", downloaded from webmaster.bia@eu.biacore.com; undated.

Biacore Website, "Principles of BIAtechnology", downloaded from webmaster.bia@eu.biacore.com, undated.

Biacore Website, "protein binding", downloaded from webmaster.bia@eu.biacore.com, undated.

Biodiscovery website, "Inventing Expression Bioinformatics", undated.

Biocode product literature, "Covert Product Identification".

Bock, G., et al., "Photometric Analysis fo Antifading Reagents for Immunofluorescence with Laser and Conventional Illumination Sources," Journal of Histochemistry and Cytochemistry, 33: 699-705 (1985).

Cambridge Healthtech Institute Website, downloaded from www.healthtech.com, undated.

Chan et al., Biochem, Biophys, Acta, vol. 204, p. 252, 1970.

Constant et al., ACS Abstract, Issue of Chemical and Engineering News, Aug. 25, 1994.

Coons et al., J. Exp. Med., vol. 91, pp. 1-14, 1950.

Corning Microarray Technology Website, "CMT-GAPS Coated Slides—FAQ's", downloaded fromwww.cmt.corning.com/dev/company_info/who/techno..., Oct. 26, 1999.

Crossley et al., Journal of the Chemical Society, Perkin Transactions 2, 1615 (1994).

Dragoco Report, pp. 12-13, 1990.

Fluorescent Inks, downloaded from http://www.uvp.com/html/inks.html; downloaded Jul. 1999.

Freemantle, "Downsizing Chemistry: Chemical analysis and synthesis on micriships promise a variety of potential benefits", C&EN London, pp. 27-36, Feb. 22, 1999.

Furneaux et al., "The formation of controlled-porosity membranes from anodically oxidized aluminum", Nature, vol. 337, No. 6203, pp. 147-149, Jan. 12, 1989.

Furomoto et al., IEEE, J. Quantum Electron, QE-6, 262 (1970).

Genometrix Website, undated.

Gill, D., Inhibition of fading in fluorescence microscopy of fixed cells; Dept. of Physics, Ben Gurion University, Israel (Jul. 1978).

Glabe et al., "Preparation and Properties of Fluorescent Polysaccharides," Analytical Biochemistry, vol. 130, pp. 287-294, 1983.

Huff, J., "Enhancement of Specific Immunofluorescent Findings with Use of a Para-Phenylenediamine Mounting Buffer," Journal of Investigative Dermatology, 78: 449-450 (1982).

Iatridou, H., et al., Cell Calcium, vol. 15, pp. 190-198, 1994.

The Invisible Barcode, downloaded from http://www.canadianpackaging.com/C...aging, downloaded Jul. 1999.

Johnson, G.D., et al., "Fading of Immunofluorescence during Microscopy: a Study of the Phenomenon and its Remedy," Journal of Immunological Methods, 55: 231-242 (1982).

Johnson, G.D., et al., "A Simple Method of Reducing the Fading of Immunofluorescence During Microscopy," Journal of Immunological Methods, 43: 349-350 (1981).

Junior LB 9509, the portable luminometer; downloaded from http://www.berthold.com.au/bioanalytical pages/LB9509.html, downloaded Oct. 26, 1999.

Larsen, R., et al., "Spectroscopic and Molecular Modeling Studies of Caffeine Complexes with DNA Intercalators," Biophysical Journal, 70:443-452 (Jan. 1996).

Lee, S.P., et al., "A Fluorometric Assay for DNA Cleavage Reactions Characterized with BamH1 Restriction Endonuclease," Analytical Biochemistry, 220: 377-383 (1994).

Minta et al., "Fluorescent Indicators for Cytosolic Calcium Based on Rhodamine and Fluorescein Chromophores," Journal of Biological Chemistsry, vol. 264, No. 14, pp. 8171-8178, May 15, 1989.

Packard Website, "The Biochip Arrayer", downloaded from www.packardinst.com/prod_serv/-Biochiparrayer.html, Oct. 26, 1999.

Packard Instrument Company website disclosure: Tools for Life Science Research, pp. 1-2.

Phosphor Technology, downloaded from http://www.phosphor.demon.co.uk/iruv.htm; downloaded Jul. 1999.

Platt, J. L., et al., "Retardation of Fading and Enhancement of Intensity of Immunofluorescence by p-Phenylenediamine," Journal of Histochemistry and Cytochemistry, 31:840-842 (1983).

Practical Fluorescence, Second Edition, G.G. Guilbault, Editor, Marcel Dekker, Inc., p. 32, 1990.

Raybourne, "Flow Cytometry in Food Microbiology," IFT Symposium FDA Jun. 21-22, 1996.

Schauer et al., "Cross-reactive optical sensor arrays", ACS Meetings, San Francisco National Meeting, Downloaded from http://schedule.acs.org/cgi-bin/ACS/perso..., Mar. 7, 2000.

Service, "Coming Soon: The Pocket DNA Sequencer," Science, vol. 282, Oct. 16,1998.

Service, "Microchip Arrays Put DNA on the Spot," vol. 282, Oct. 16, 1998.

Skolnick, "Russian and US Researchers Develop 'Biochips' for Faster, Inexpensive Biomedical Tests", JAMA, vol. 275, No. 8, pp. 581-582, Feb. 28, 1996.

Stanley, "UT scientists engineer a tiny arbiter of taste", Austin American Statesman Newspaper, p. B1, Jul. 26, 1998.

Stringer, "Photonics Center launches three new companies", Mass. High Tech., p. 11, Apr. 26-May 2, 1999.

Stryer, L., "Fluorescence Energy Transfer as a Spectroscopic Ruler," Ann. Rev. Biochem., 47:819-46 (1978).

Uchiyama, H., et al., "Detection of Undegraded Oligonucleotides in Vivo Fluorescence Resonance Energy Transfer," Journal of Biological Chemistry, 271: 380-384, Jan. 1996).

V.L. Engineering, Our Products, downloaded from http://www.vlengineering.com/products/wizard_PV6A, Downloaded Jul. 1999.

Wittwer, C.T., et al., "Continuous Fluorescence Monitoring of Rapid Cycle DNA Amplification," BioTechniques, 22:130-138 (Jan. 1997).

Molecular Expressions Microscopy Primer: Photomicrography, http://micro.magnet.fsu.edu/primer/java/photomicrography/filterclasses/index.html, 2 pages.

Videk, Videk signs another contract with U.S. Treasury-Oct. 14, 2003, 2 pages, http://videk.com/press.asp.

Videk signs multi-million dollar contract with Northrop Grumman—Nov. 14, 2003, 2 pages, http://videk.com/press.asp.

Videk, "Videk is allowed significant U.S. Patent OCR/OCV", 1 page—Jul. 26, 2002, http://videk.com/press.asp.

Videk, "InViziCode™ Continuous Web Printer is Launched" 1 page—May 13, 2002, http://videk.com/press.asp.

Videk, "Data From Vision System is Available in Real Time to Three Locations on Two Continents with Videk VisionAnywhere™", 2 pages—Apr. 9, 2001, http://videk.com/press.asp.

Videk, Invisible Ink Printing and Reading Technology is One of Seven New Solutions to be Demonstrated by Videk at Xplor, 2 pages—(Oct. 23, 2000), http://videk.com/press.asp.

Videk, "Inspect on Demand" Patent to expand ADF capabilities for on demand digital printing - Oct. 23, 2003, 1 page, http://videk.com/press.asp.

Videk, "Videk Invisible Ink Printing & Reading to be Demonstrated for First Time on Production Printers at the Oce" May 9, 2001, 1 page, http://videk.com/press.asp.

Videk, "Invisible Code Printing and Reading Products lead the way at Xplor for Videk and their Partners"- Oct. 21, 2002, 2 pages, http://videk.com/press.asp.

Matrixscanner MAC 320, "Today Pharmacode - Tomorrow Data Matrix ECC 200", printed Nov. 17, 2003, 2 pages, http://omnitron-ag.de/e/mac320.htm.

InViziCode™, "InViziCode Reading Systems", 3 pages, http://videk.com.

InViziReaders: In ViziCode Reading Systems: How Videk InViziReaders work: 1 page, printed Nov. 17, 2003, http://www.invizicode.com.

Videk, "Matchvision", 1 page, printed Nov. 17, 2003, http://videk.com/matchvision.asp.

Videk, "Print Verification Stand", 1 page, printed Nov. 17, 2003, http://videk.com/printerveri.asp.

Videk, "2-D Code Reading" 1 page, printed Nov. 17, 2003, http://videk.com/2dcode.asp.

Videk, Videk Enters into Partnership with Omnitron AG - Sep. 21, 2001, http://videk.com/press.asp.

Gunther, "The Future is Now... Invisible Printing and reading", 2 pages, printed Nov. 17, 2003, http://www.invizicode.com/Invizi_Article.htm.

InViziCode™, "Frequently Asked Questions", 2 pages, printed Nov. 17, 2003, http://www.invizicode.com/FAQ.htm.

Videk, Inserter Visiton, 1 page, printed Nov. 17, 2003, http://videk.com/inserter.asp.

Videk, "DocuVision" 1 page, printed Nov. 17, 2003, http://videk.com/docuvision.asp.

Videk enters into IBM Vendor Partner Program - Dec. 19, 2001, http://videk.com/press.asp.

Videk "Videk, Sure-Feed Engineering Demonstrate Invisible Ink Reading and Printing Technology at Production Speeds" m 1 page - Apr. 20, 20010, http://videk.com/press.asp.

Videk, "VidekVision™ Check Inspection System Verifies U.S. Treasury Checks", 1 page - Aug. 31, 2000, http://videk.com/press.asp.

Videk, "Inspect on Demand" Patent to expand ADF capabilities for an demand digital printing - Oct. 23, 2003, 1 page, http://videk.com/press.asp.

Videk, "Videk Invisible Ink Printing & Reading to be Demonstrated for First Time on Production Printers at the Oce" May. 09, 2001, 1 page, http://videk.com/press.asp.

Videk, "Invisible Code Printing and Reading Products lead the way at Xplor for Videk and their Partners"- Oct. 12, 2002, 2 pages, http://videk.com/press.asp.

Matrixscanner MAC 320, "Today Pharmacode —Tomorrow Data Matrix ECC 200", printed Nov. 17, 2003, 2 pages, http://omnitron-ag.de/e/mac320.htm.

InViziCode™, "InViziCode Reading Systems", 3 pages, http://videk.com

InViziReaders: InViziCode Reading Systems: How Videk InViziReaders work: 1 page, printed Nov. 17, 2003, http://www.invizicode.com.

Videk, "Matchvision", 1 page, printed Nov. 17, 2003, http:videk.com/matchvision.asp.

Videk, "Print Verification Stand", 1 page, printed Nov. 17, 2003, http://videk.com/printerveri.asp.

Videk, "2-D Code Reading"1 page, printed Nov. 17, 2003, http://videk.com/2dcode.asp.

Videk, Videk Enters into Partnership with Omnitron AG - Sep. 21, 2001, http://videk.com/press.asp.

Gunther, "The Future is Now... Invisible Printing and reading", 2 pages, printed Nov. 17, 2003, http://www.invizicode.com/invizi_Article.htm.

InViziCode™, "Frequently Asked Questions", 2 pages, printed Nov. 17, 2003, http://www.invizicode.com/FAQ.htm.

Videk, InserterVisiton, 1 page, printed Nov. 17, 2003, http://videk.com/inserter.asp.

Videk, "DocuVision" 1 page, printed Nov. 17, 2003, http://videk.com/docuvision.asp.

Videk signs multi-million dollar contract with Northrop Grumman - Nov. 14, 2003, 2 pages, http://videk.com/press.asp.

Videk, "Videk is allowed significant U.S. Patent OCR/OCV", 1 page - Jul. 26, 2002, http://videk.com/press.asp.

Videk, "InViziCode™ Continuous Web Printer is Launched" 1 page - May 13, 2002, http://videk.com/press.asp.

Videk enters into IBM Vendor Partner Program - Dec. 19, 2001, http://videk.com/press.asp.

Videk "Videk, Sure-Feed Engineering Demonstrate Invisible Ink Reading and Printing Technology at Production Speeds"m 1 page - Apr. 20, 20010, http:videk.com/press.asp.

Videk, "*Data from Vision System is Available in Real Time to Three Locations on Two Continents with Videk VisionAnywhere™*", 2 pages - Apr. 9, 2001, http://videk.com/press.asp.

Videk, *Invisible Ink Printing and Reading Technology is One of Seven New Solutions to be Demonstrated by Videk at Xplor, 2 pages*- (Oct. 23, 2000), http://videk.com/press.asp.

Videk, "VidekVision™ Check Inspection System Verifies U.S. Trreasury Checks", 1 page - Aug. 31, 2000, http://videk.com/press.asp.

* cited by examiner

PORTABLE AUTHENTICATION DEVICE AND METHOD OF AUTHENTICATING PRODUCTS OR PRODUCT PACKAGING

CROSS-REFERENCE TO RELATED APPLICATIONS

This application claims benefit of U.S. Provisional Application Ser. No. 60/193,158, filed Mar. 28, 2000, titled "Portable Authentication Device and Method of Authenticating Products or Product Packaging" and U.S. Provisional Application Ser. No. 60/144,544, filed Jul. 16, 1999, titled "Portable Authentication Device and Method of Authenticating Products or Product Packaging."

FIELD OF THE INVENTION

This invention relates to authentication devices and methods, and more particularly, to a portable hand-held device and method of authenticating products or product packaging.

BACKGROUND OF THE INVENTION

Brand identity plays an important role in the marketplace. It provides a means for consumers to identify and rely on products coming from a particular source. It also provides a means for companies to attract and build goodwill with customers, thereby encouraging repeat business. Companies therefore spend billions of dollars on advertising and product development to establish such brand identity.

The benefits of and the resources expended on brand identity create powerful incentives for counterfeiters. Among the most prevalent illicit and illegal practices threatening brand identity are counterfeiting of the product itself, counterfeiting or theft of the package or container for use with an authentic or counterfeit product, or diversion of the product wherein the product manufactured for sale in a certain market is purchased by an intermediary in that designated market and sold in a competing market.

Such practices result in significant damage to the owner of the brand including lost sales, tarnished consumer perception of the brand, and liability due to claims made on counterfeit products. For example, the International Anti-Counterfeiting Coalition estimates that global revenue lost due to counterfeiting is as high as $200 billion per year. In addition, labeling industry estimates suggest that counterfeiting accounts for more than 10% of the world trade. Finally, pharmaceutical companies estimate that they are losing approximately $500 million in lost sales in India alone due to imitation drugs.

In addition to injury to brand identity, rights to copyrighted works may also be compromised by unauthorized reproduction of copyrighted material.

Commonly assigned U.S. Pat. No. 5,753,511 and U.S. patent Ser. No. 09/232,324, both of which are herein incorporated by reference in their entireties, disclose automated methods of evaluating and discriminating products to establish authenticity or point of origin of the product. Aspects of these inventions relate to automated methods for identifying key ingredients and/or the relative amounts of key ingredients in products using light-emissive compounds. In particular, during testing, an identifying light-emissive compound is mixed with a small amount of the sample to be tested. The sample, having the particular light-emissive compound, is then brought into close proximity with and viewed using a custom optical scanner to detect light emission of a particular wavelength from the sample.

One advantage of the test procedure disclosed in the '511 patent and the '324 application is that the sample to be authenticated is mixed with a particular light-emissive compound immediately prior to testing. This allows for the product to remain unadulterated for consumption yet allows for the interaction of the particular light-emissive compound with key ingredients in the product to establish a fingerprint for the product.

In some instances, however, it may be desirable to permanently mark the product or the package with an identifying or authenticating mark. Such identification allows, for example, detecting whether the product itself is authentic, when and where the product was produced, whether the product package is authentic or whether the product package relates to the product. Known methods of permanent marking include the use of invisible inks, holograms or other identifying marks placed on the product or product package. However, some of these techniques may not be practical in ambient light conditions, and therefore cannot be practiced in lighted areas such as retail stores. Another method includes printing the product or package with an ink containing an infrared absorbing additive. A scanner is used to detect infrared absorbence, thereby indicating the presence of the additive. This method suffers from a number of disadvantages. For example, identification of product specific information is not possible. Rather, only discrimination between a product or package containing the additive and a product or package lacking the additive is possible. Thus, discriminating between different products, manufacturing locations, or other desired information is not possible. In addition, the scanner used to read the ink is a dedicated scanner and is not capable of reading other information such as a bar code.

The disadvantages of the above noted methods are overcome in aspects of the present invention. For example, one or more of multiple light-emissive compound is mixed with ink and printed on the product or the product package during or after manufacture of the product to create an identifier that is capable of providing multiple pieces of information and that is undetectable with conventional lights and optical scanners. The authenticity of the product or package may be subsequently quickly determined. In some instances, the authenticity mark may be the bar code on the package. In this regard, the authentication device of the present invention may be used to quickly scan the bar code to identify the product as well as to verify the authenticity of the product and/or package. Authenticity of the product package may then be linked to the authenticity of the product itself. Thus, not only may counterfeit products or packages be detected but also diversion of authentic products may be readily determined.

SUMMARY OF THE INVENTION

In one illustrative embodiment, a method of selecting a light-sensitive compound for application to a substrate and subsequent detection on the substrate is disclosed. The method includes irradiating the substrate with light, sensing an emission spectrum of the substrate in response to the irradiation, determining at least one peak wavelength of light within the emission spectrum; and selecting a light-sensitive compound that emits or absorbs light at a first wavelength in response to the irradiating light, wherein the first wavelength is different from the at least one peak wavelength.

In another illustrative embodiment, a detection device for detecting a mark on a substrate is disclosed. The mark including a light-sensitive compound that emits or absorbs light at a first wavelength. The device includes a video mode having a detector for detecting an image of at least a portion of the substrate known to include the mark, and a video display for viewing the image. The device also includes a snapshot mode having a light for irradiating the substrate, a detector for detecting light emission or absorption of the light-sensitive compound in the mark, and a snapshot display for displaying data representative of the detected emission or absorption of the light-sensitive compound in the mark, thereby capturing the mark on the image of the portion of the substrate.

In another illustrative embodiment, an authentication mark for determining whether a product or a product package is authentic is disclosed. The mark includes a visible mark selected from the group consisting of trademarks, product names, company names and logos, the mark being applied on at least a portion of the product or product package; and an invisible mark applied on the product or product package and intersecting at least a portion of the visible mark.

In another illustrative embodiment, an authentication system is disclosed. The system includes an authentication device capable of ratiometrically analyzing the emission of light from an image of at least two discreet wavelengths, a substrate having a compound emitting at a first wavelength in response to excitation by a light source of a specific wavelength and a compound emitting at the second wavelength in response to excitation by a light source of a specific wavelength, and a printer.

In another illustrative embodiment, a method of resolving an image is disclosed. The method includes simultaneously detecting a first wavelength with a first detector and a second wavelength with a second detector, determining a first threshold intensity for the first wavelength and a second threshold intensity for the second wavelength, dividing pixels on the first detector into those exceeding the first intensity threshold and those falling below the first intensity threshold, dividing pixels on the second detector into those exceeding the second intensity threshold and those falling below the second intensity threshold, determining a group of pixels that exceed the first intensity threshold as well as exceed the second intensity threshold, and calculating a first ratio of the intensity of the first wavelength detected to the second wavelength detected for pixels within the group.

In another illustrative embodiment, a method of authentication is disclosed. The method includes producing an ink containing a first compound that emits light at a first discreet wavelength and a second compound that emits light at a second discreet wavelength, printing a readable image on a substrate with the ink, detecting a ratio of the first compound to the second compound on the substrate, indicating whether the ratio is within a range, and reading the image.

In another illustrative embodiment, a water insoluble ink is disclosed. The ink includes a solvent, a first light sensitive compound having an emission wavelength in one of the visible and non-visible ranges wherein the light sensitive compound is electrostatically dispersed in the solvent, and a second light sensitive compound.

In another illustrative embodiment, a method of conveying information is disclosed. The method includes printing an image on a substrate with an ink wherein the ink includes a first compound emitting in a visible range and a second compound emitting in an IR range, irradiating the substrate with light of a wavelength capable of exciting at least one of the first compound and the second compound, detecting the light emitted in response to irradiating, determining a ratio of the emission of the first compound to the emission of the second compound, comparing the ratio with a standard, and displaying the image.

In another illustrative embodiment, a detection device for detecting a mark on a substrate is disclosed. The mark includes a light-sensitive compound that emits or absorbs light at a first wavelength. The device includes a light source for irradiating the light-sensitive compound, and a filter for filtering undesired wavelengths of light from irradiating the light-sensitive compound.

In another illustrative embodiment, a detection device for detecting a mark on a substrate method of authentication is disclosed. The mark including a light-sensitive compound that emits or absorbs light at a first wavelength. The device includes a light for irradiating the substrate, a detector for detecting light emission or absorption of the light-sensitive compound in the mark, a display for viewing the mark, and a touch screen for inputting commands to the device.

In another illustrative embodiment, a detection device for detecting a mark on a substrate is disclosed. The mark including a light-sensitive compound that emits or absorbs light at a first wavelength. The device includes a light for irradiating the substrate, a detector for detecting light emission or absorption of the light-sensitive compound in the mark, a display for viewing the mark, and a processor for processing detected light emission or absorption and displaying the light emission or absorption on the display in a predetermined color.

In another illustrative embodiment, a detection device for detecting a mark on a substrate is disclosed. The mark including a light-sensitive compound that emits or absorbs light at a first wavelength. The device includes a light source for irradiating the substrate with a flash of light having a predetermined wavelength of light suitable for irradiating the light-sensitive compound, a detector for detecting light emission or absorption of the light-sensitive compound in the mark, and a display for viewing the mark.

BRIEF DESCRIPTION OF THE DRAWINGS

The invention will now be described, by way of example, with reference to the accompanying drawings, in which.

DETAILED DESCRIPTION

Figure 1:
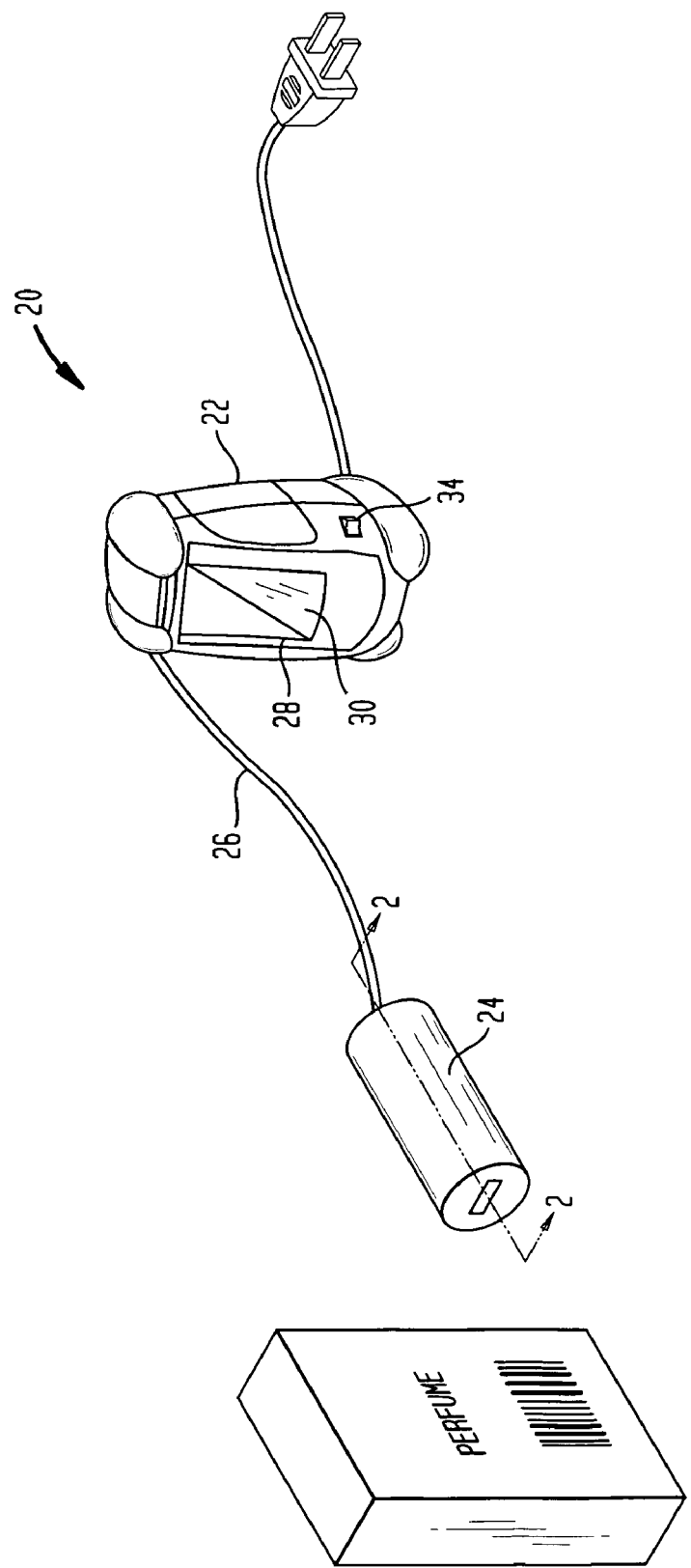
FIG. 1 is a diagrammatic representation of one embodiment of a portable authentication device according to the present invention.

The invention features a portable authentication device and method of authenticating products or packaging by analyzing key ingredients on products or on product packaging. Light-sensitive compounds can be used to identify the product or product packaging. In one aspect, the product or product package may include visible or invisible ink containing a particular light-sensitive compound. The ink may be printed in one or more locations on the product or product packaging to produce an authentication mark, such as a bar code. In another aspect, the device includes an assembly for providing a source of light to irradiate the ink containing the light-sensitive compound on the sample product or product package, an optical detector to detect certain spectral properties emitted or absorbed by the irradiated ink and a controller to determine the authenticity of the sample product or product package by comparing the emitted or absorbed properties to a standard. It is to be appreciated that the term "authentic", or any derivative thereof, means an identification as being genuine or without adulteration or identification of point of origin or other desired information.

Light-emissive compounds emit light in response to irradiation with light. Light emission can be a result of phosphorescence, chemiluminescence, or, more preferably, fluorescence. Specifically, the term "light-emissive compounds," as used herein, means compounds that have one or more of the following properties: 1) they are a fluorescent, phosphorescent, or luminescent; 2) react, or interact, with components of the sample or the standard or both to yield at least one fluorescent, phosphorescent, or luminescent compound; or 3) react, or interact, with at least one fluorescent, phosphorescent, or luminescent compound in the sample product, the standard, or both to alter emission at the emission wavelength.

Light-absorbing compounds absorb light in response to irradiation with light. Light absorption can be the result of any chemical reaction known to those of skill in the art. Thus, the present invention may be discussed below with reference to emission of light in response to irradiation with light, however, the present invention is not limited in this respect and light absorbing compounds may be used.

Thus, as used herein, the term "light-sensitive compounds" refers to both light emissive compounds as well as light absorbing compounds.

The term "fingerprint," as used herein, means light emission or absorption intensity and/or intensity decay at a particular wavelength or range of wavelengths, from one or more light-sensitive compounds in combination with a standard (e.g., authentic) product or product package. Accordingly, each product or product package can have a particular fingerprint.

The term "fingerprint profile," as used herein, means an assembly of fingerprints of a standard in combination with a series (or profile) of different light-sensitive compounds.

The term "sample characteristic," as used herein, refers to the light emission or absorption quantity or intensity and/or intensity decay or change in quantity from one or more light-sensitive compounds in the ink on a sample product or product package.

The term "substrate" refers to any surface onto which an ink may be applied.

The term "invisible" means invisible to the naked eye.

The term "readable image" is an image that conveys information when read by a human or a machine. Examples include, but are not limited to, numbers, letters, words, logos, and bar codes.

The "visible range" is from 400–700 nm.
The "UV range" is from 40–400 nm.
The "IR range" is from 700–2400 nm.

In one embodiment, as illustrated in FIG. 1, the portable authentication device is a table-top device operatively connected to a hand-held probe. The device 20 includes a base unit 22 coupled to a hand-held probe assembly 24 via a flexible conduit 26. The flexible conduit allows easy manipulation and articulation of the probe assembly 24 into any desired orientation. The base unit 22 includes a receptacle 28 for receiving a hand-held controller or processor 30, such as a PALM PILOT® or other data logger. Power to the device 20 may be provided through a suitable power cord 32, or, alternatively, may be powered with batteries, such as rechargeable batteries. A switch 34 may also be provided. A means to lock out the device may be used, such as, for example, requiring a password to activate the device. Although in the embodiment of FIG. 1 a base unit and a PALM PILOT® is provided, the invention may be used in conjunction with a dedicated controller or a laptop or desktop computer.

In the embodiment shown in FIG. 1, the device 20 is used to authenticate a sample product package, such as the perfume package 36. In this respect, the probe assembly, having a light source, as will be further explained hereinafter, scans the product packaging for certain spectral properties of light-sensitive compounds mixed with the ink used to print the bar code 38, for example. The probe assembly 24 may also be used to scan the bar code 38 or certain conventional identifying information typically provided by such a bar code, such as the name and price of the product. In addition, or in the alternative, the probe assembly scans other areas of the package 36 known to have been printed with visible or invisible ink containing one or more light-sensitive compounds. As will be further described hereinafter, the ink may be printed or otherwise placed on the product itself.

Figure 2:
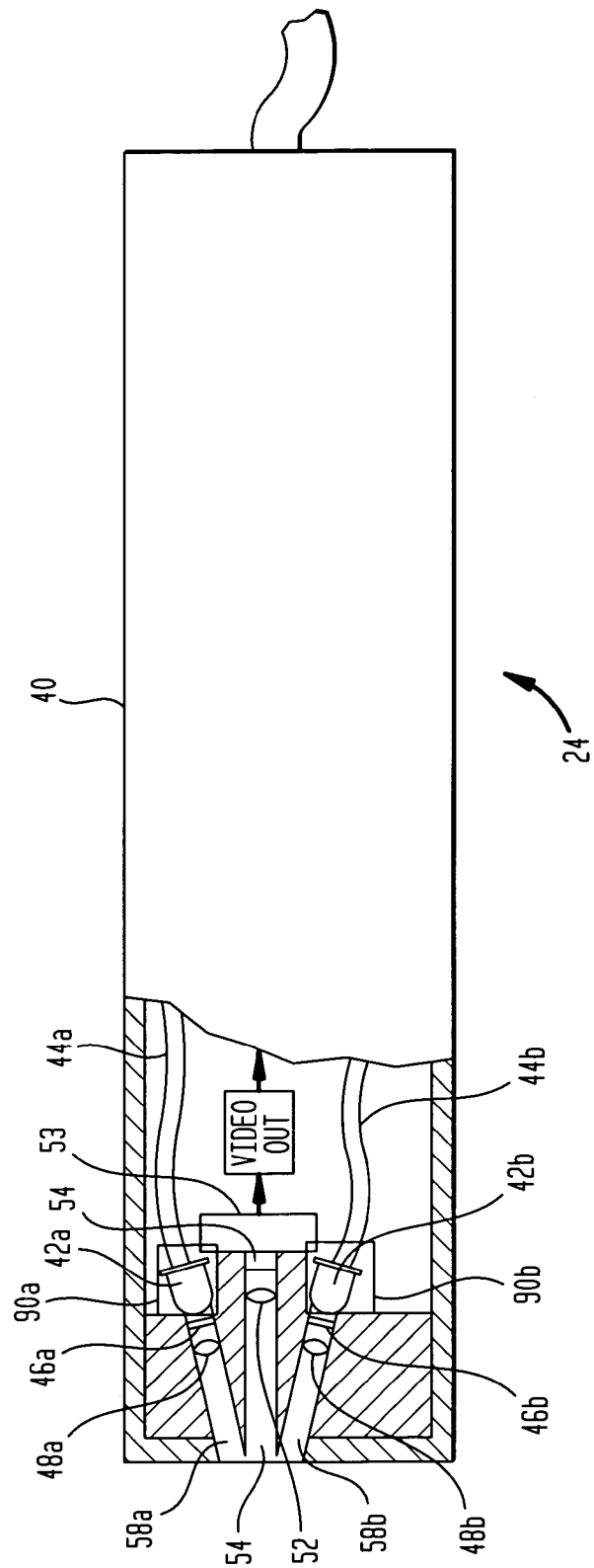
FIG. 2 is a cross-sectional view of a probe assembly of the portable authentication device taken along line 2—2 of FIG. 1.

The hand-held probe assembly 24, as best shown in the diagrammatic cross-sectional view of FIG. 2, includes a probe body 40, which may be a unitary body or may be formed with a plurality of discrete body parts. The probe body includes one or more light sources disposed therein. In a preferred embodiment, the light sources 42a and 42b are provided by light-emitting diodes such as Model Number HLMP CB 15 sold by Hewlett-Packard, California, USA, which may or may not be infrared light-emitting diodes. In an alternative embodiment, the light source may be a laser light source. In either case, the light source is matched to the excitation wavelength of one or more light-sensitive compounds mixed with the ink on the product or product packaging. The leads 44a and 44b of the light source are connected, through the conduit, to the base unit 22 to receive power for excitation. The probe assembly may further include source filters 46a and 46b, such as bandpass or cutoff filters, to isolate wavelengths of light from the light source. Lenses 48a and 48b, such as symmetric convex lenses each having a 10 mm focal length with a 10 mm diameter, focus light emitted from the light sources. One or more prisms (not shown) may also be used to direct or focus light. Ports 58a and 58b are formed in the probe assembly to allow light from the light source to irradiate the ink. Because the light from the light sources are allowed to exit the probe assembly, the product or product package may be scanned from a distance of up to four feet, up to six feet or even up to twelve feet.

The probe assembly 24 may further include lens 52, which may be similar to lenses 48a and 48b, for focusing light emitted from the ink of the authenticating mark onto an optical detector 53, such as a charge couple device (CCD) Model Number H53308 sold by EdmundScientific, New Jersey, USA. Other suitable detectors, such as a CMOS or PMT, may be employed. An emission filter 54, such as a bandpass or cutoff filter (or light absorption), is used to isolate excitation wavelengths from emission spectra due to light emission from the ink. Port 59 is formed in the probe assembly to allow emitted light from the ink or absorbed light caused by the ink to be detected by the optical detector.

Of course, the optical detector 53 may be located within the basic unit 22 in which case a fiber optic cable may be used to transmit the light from the probe assembly 24 to the base unit 22. In addition, although the probe assembly shown and described herein is operatively connected to the base unit 22, all components necessary to test a sample product or product package for authenticity may be contained within the base unit directly. In such an embodiment, the base unit 22 includes one or more light sources, suitable lenses and filters, and an optical detector, as will be further described hereinafter.

Detection of light absorbed from the light-absorbing compounds may be made using any suitable imaging technique. Similarly, detection of light emitted from the light-emissive compounds may be made using any suitable imaging technique such as infrared, near infrared, far infrared, Fourier transformed infrared, Raman spectroscopy, time resolved fluorescence, fluorescence, luminescence, phosphorescence and visible light imaging. The base unit 22 includes corresponding circuitry and software, as will be explained hereinafter, to receive the video information from the optical detector and convert the information into fingerprint data. Alternatively, such circuitry and software may be part of the PALM PILOT®. In any event, sample characteristics of the ink may then be compared with authentic fingerprint data or fingerprint profile data stored in the PALM PILOT® or stored in a remote host computer and associated database. In the latter embodiment, the base unit 22 or the PALM PILOT® communicates with a host computer via a data cable through, for example, a modem. Of course, those skilled in the art will recognize in view of this disclosure that other communication links may be used, such as a direct data link, satellite transmission, coaxial cable transmission, fiber optic transmission or cellular or digital communication. The communication link may be a direct line or through the Internet. The host computer also communicates with a database which stores a plurality of fingerprints or fingerprint emission profiles.

According to one aspect of the invention, one or more desired light-sensitive compounds are printed on the product or the product package to create an authentication mark. In one embodiment, one or more light-sensitive compounds, such as, for example, one or more fluorescent light-emissive compounds, is mixed with ink to be printed on the product or product package. The particular light-sensitive compound selected should have minimal impact on the visible characteristics of the ink so as not to be noticeably different than other printing on the package. For example, one or more light-emissive compounds mixed with visible ink (such as black ink) is used to print information on the product package, such as the bar code 38 of the package 36, shown in FIG. 1.

The ink may be applied to any substrate such as a package or product, by any technique capable of causing the ink to adhere to the substrate, including any technique by which conventional inks may be transferred. For example, any kind of printer can be used, such as a multi-color printing press, an ink jet printer, a dot matrix printer (where the ribbon is soaked with the light-sensitive compound), silk screening, or pad printing. Alternatively, the ink may be first applied to a decal or adhesive label which is in turn applied to the substrate. Preferably, an ink jet printer is used, as information that may be printed may be changed.

Using an ink jet printer may also be advantageous because reservoirs having different light-sensitive compounds may be readily changed, for example, through a suitable communication link, depending upon the product, customer, date and/or place of manufacture or any other desired data. In addition, ink jet printers are commonly used to print the bar code on a label or directly on the package itself. It is to be appreciated that the authenticating mark may be configured to any desired pattern ranging from a single dot that may convey no more information than what is contained in the ink formulation to a bar code to a more complex pattern that may convey information related to, for example, product, date, time, location, production line, customer, etc.

The printing may also be made on the container for the product, if one is used, or the product itself, if the product lends itself to printing, such as in jewelry, bank cards, credit cards, sports memorabilia, automobile components and body parts, and optical disks, such as CD's, DVD's, laser disks and the like, or any combination thereof. In any of these examples, the light-sensitive compound may be mixed with ink.

In order to authenticate copyrighted material, an authenticating mark may be printed directly onto a writing, sculpture, or other piece of art work. For example, a portion of a book cover may be overprinted with an authenticating mark that is invisible, or not apparent, to the naked eye. If a counterfeiter were to then attempt to duplicate the book cover, for example, by photocopying, the authenticating mark would not be reproduced and a subsequent analysis would reveal that the book cover was not authentic.

Another example is to use the ink of the invention to identify personal property. For example, the light-sensitive inks of the present invention could be applied to a particular portion of a piece of personal property. The ink would contain light-sensitive compounds that would be unique to the owner of the property. If the property is then lost or stolen and later recovered, it may be identified by the unique fingerprint that is emitted by the ink as well as by any other information provided by the image. The ink may also be unnoticeable to a thief, and therefore no effort would be made to remove the identifying mark.

In addition, the ink could contain light-sensitive compounds that are unique to identify certain characteristics of a product or product package that the owner wishes to convey. For example, the inks may indicate the time and place of origin of the product. In addition, the inks may be formulated differently on an as needed basis. Examples of when such formulation may change may include, but not be limited to, when a counterfeiter is successfully able to reverse engineer the particular ink that an owner of the property is utilizing, as will be further described hereinafter.

If the product does not lend itself to printing directly thereon, other methods of identifying and authenticating the product may be used. For example, the method described in the '324 application may be used. Alternatively, the package material itself may have fibers that are soaked with one or more light-sensitive compounds. In other embodiments, a thread that is soaked with one or more light-sensitive compounds may be woven through the package. With respect to authenticating the product itself, a compatible thread or threads soaked with one or more light-sensitive compounds may be woven through materials for use in clothing, luggage, book covers, carpeting, currency, prints or other artwork, and the like.

With respect to authenticating CD's, a light-sensitive compound may be printed or otherwise impregnated onto a music, video or software CD and the laser in the CD player or reader would be capable of irradiating the light-sensitive compound. The optical detector in the CD player or reader would detect whether a particular light-sensitive compound is present to generate a sample characteristic. The light-sensitive compound may be keyed to an internal software authorization code such that a match between the external code (i.e., the light-sensitive compound printed or impregnated onto the CD) and the internal code is needed to play, run, copy, or install the music, video or software. Software on the CD itself or embodied in the player or reader or associated computer would cause a comparison between the sample characteristic and the internal code (i.e., the fingerprint). If the sample characteristic does not match the fingerprint, continued use of the CD would not be permitted. In this respect, only when there is a suitable match between the external surface code (i.e., the sample) and the internal authorization code number that is embodied into the computer code (i.e., the fingerprint) will the software function. Thus, while duplication of the CD may be possible, use of the CD would not.

In one embodiment, encryption may be employed for an added layer of security. In this respect, the sample characteristic of the light-emissive compound on the CD may represent an encrypted signal of the actual signal required to operate the CD. Suitable encryption techniques now known or later developed may be employed.

In another embodiment, the sample characteristic may be used as part of the program to run the software on the CD. Thus, without the required light-sensitive compound, the program on the CD would be missing certain code and therefore would be prevented from operating correctly.

Although the above embodiments are described with reference to a CD, it is to be appreciated that the present invention is not limited in this respect and that the above embodiments may be employed with DVD's, laser disks, as well as other types of optical disks.

With the combination of providing an authenticating mark on any one or more of the product, product package, bar code, label, container or any combination thereof, a determination may be made using, for example, device 20, whether the correct product is packaged in the correct packaging. Thus, point of origin, date of origin, intended market, or any other desired information may be readily linked to the product.

An authenticating mark of the present invention may be applied anywhere to a product or product package including on a package flap or inside the package itself. It may be preferable for the authenticating mark to overlap another printed portion on the product or product package. Such printed portions may include those items that are particularly important to the sale of the product, for example, product name, trademark, logo, and company name. In one preferred embodiment, the authenticating mark is placed on the same location on the package as is the trademark of the product. In this manner, any attempt to remove the authenticating mark would also result in the destruction of the trademark on the package. The authenticating mark may be applied to the package as part of the ink formulation used to print the trademark itself or alternatively may be applied either under or over the printing of the trademark. Not only does this placement make it more difficult for the authenticating mark to be removed, but it also provides an easy-to-locate target when checking to verify the presence of the authenticating mark.

An example of a formulation of a printable ink containing one or more light-sensitive compound will now be described. Light-emissive compounds may be dissolved in methyl-ethyl-ketone (MEK) and added to the ink. In one example, 19 mg of one or more light-emissive compounds is dissolved in 1 ml of MEK, hereafter identified as Stock I. In another example, 40 mg of one or more light-emissive compound is dissolved in a 1 ml of MEK, hereafter identified as Stock II. One formulation of visible ink includes 650 g of black ink (such as Black ink #601 produced by the Willett Corporation of England) mixed with 3.5 ml of Stock I, which is designated as Formulation 1. To produce an ink capable of producing two peak wavelengths of light when irradiated (the use of which will be discussed hereinafter), 400 g of Formulation 1 may be mixed with 2 ml of Stock II. Additional compounds may be added to the ink to improve its properties. These compounds may include one or more of the following: a binder; a humectant; one or more lower alcohols; a corrosion inhibitor; a biocide; and a compound used to electrostatically stabilize particles of a colloid suspension. Any number of light-sensitive compounds may be added at a variety of concentrations. For example, a concentration of 1.275 mM has been found to provide an adequate response for some light-emissive compounds. To facilitate printing, the stock solution or the ink may be filtered, for example, through a 2.0 micron filter to remove large particles. If an ink jet printer is used, it may be preferable to enlarge a standard-sized orifice on the ink jet cartridge so that the ink composition may be more easily applied.

A wide variety of light sensitive compounds may be used with the present invention including any compounds that emit or are excited by light having a wavelength of about 300–2400 nm, and in one embodiment, 300–1100 nm. Groups from which the light sensitive compounds may be chosen include, but are not limited to, inorganic pigments, organic compounds, photochromic compounds, photochromic compounds cross linked with various polymers, photochromic compounds encapsulated in polymers and thermally stable near infrared fluorophoric compounds copolymerized with an ester linkage.

For example, inks of the present invention may be water dissipatable polyesters and amides such as the compounds disclosed in U.S. Pat. Nos. 5,292,855, 5,336,714, 5,614,008 and 5,665,151, each of which is hereby incorporated by reference herein.

Figure 3:
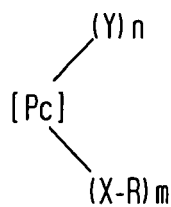
FIGS. 3–6 are chemical structures of various light-sensitive compounds according to various embodiments of the present invention.
Figure 4:
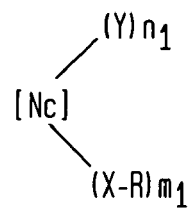
Figure 5:
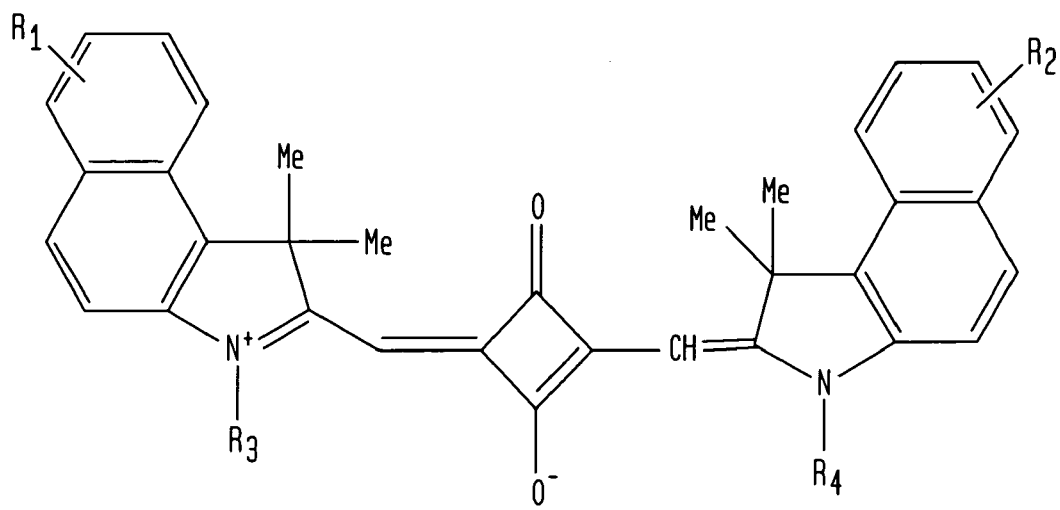

In one embodiment, the near infrared fluorescent compounds are selected from the phthalocyanines, the naphthalocyanines and the squarines (derivatives of squaric acid) that correspond respectively to the structures shown in FIGS. 3, 4 and 5. In these structures, Pc and Nc represent the phthalocyanines and naphthalocyanine moieties, covalently bonded to hydrogen or to the various metals, halometals, organmetallic groups and oxymetals including AlCl, AlBr, AlF, AlOH, AlOR$_5$, AlSR$_5$, Ca, Co, CrF, Fe, Ge, Ge(OR$_6$), Ga, InCl, Mg, Mn, Ni, Pb, Pt, Pd, SiCl$_2$, SiF$_2$, SnCl$_2$, Sn(OR$_6$)$_2$, Si(OR$_6$)$_2$, Sn(SR$_6$)$_2$, Si(SR$_6$)$_2$, Sn, TiO, VO or Zn, where R$_5$ and R$_6$ are hydrogen, alkyl, aryl, heteroaryl, lower alkanoyl, or trifluoroacetyl groups.

X is oxygen, sulfur, selenium or tellurium. Y is alkyl, aryl, halogen or hydrogen and R is an unsubstituted or substituted alkyl, alkenyl, alkynyl.

—(X—R)$_m$ is alkylsulfonylamino, arylsulfonylamino, R$_1$ and R$_2$ are each independently selected from hydrogen, lower alkyl, lower alkoxy, halogen aryloxy, lower alkylthio, lower alkylsulfonyl, $R_3$ and $R_4$ are each independently selected from hydrogen, lower alkyl, alkenyl or aryl; n is an integer from 0–12;$n_1$ is an integer from 0–24, m is an integer from 4–16;$m_1$ is an integer from 0–16, provided that the sums of the n+m and $n_1+m_1$ are 16 and 24 respectively.

In the compounds above, the structures may include at least one polyester reactive group to allow the compound to be incorporated into a polymeric composition and to be bound by covalent bonds.

The ink of the invention may also include photochromic compound such as photochromic compound incorporated into a polymeric composition and photochromic compounds encapsulated to form microcapsules as described in U.S. Pat. No. 5,807,625, which is hereby incorporated by reference.

In one embodiment, these photochromic compounds are from three classes:
 (i) Spiro-indolino-naphthoxazines.
 (ii) Fulgides which are derivatives of bis-methylene succinic anhydride and fulgimides which are derivatives of bis-methylene succinic imide where the imide nitrogen may be substituted by alkyl, aryl or aralkyl.
 (iii) Spiro(1,8a)-dihydroindolizines.

The ink of the invention may also include microbeads labeled with organic/inorganic compounds as described in U.S. Pat. No. 5,450,190, which is hereby incorporated by reference.

Also useful as light-sensitive compounds with the present invention are the compounds or compound combinations described in U.S. Pat. No. 5,286,286, which is hereby incorporated by reference. These may include:
5,10,15,20-tetrakis-(1-methyl-4-pyridyl)-21H, 23H-porphine tetra-p-tosylate salt;
5,10,15,20-tetrakis-(1-methyl-4-pyridyl)-21H,23H-porphine tetrachloride salt;
5,10,15,20-tetrakis-(1-methyl-4-pyridyl)-21H,23H-porphine tetrabromide salt;
5,10,15,20-tetrakis-(1-methyl-4-pyridyl)-21H,23H-porphine tetra-acetate salt;
5,10,15,20-tetrakis-(1-methyl-4-pyridyl)-21H,23H-porphine tetra-perchlorate salt;
5,10,15,20-tetrakis-(1-methyl-4-pyridyl)-21H,23H-porphine tetrafluoroborate salt;
5,10,15,20-tetrakis-(1-methyl-4-pyridyl)-21H,23H-porphine tetra-perchlorate salt;
5,10,15,20-tetrakis-(1-methyl-4-pyridyl)-21H,23H-porphine tetrafluoroborate salt;
5,10,15,20-tetrakis-(1-methyl-4-pyridyl)-21H,23H-porphine tetra-perchlorate salt;
5,10,15,20-tetrakis-(1-methyl-4-pyridyl)-21H,23H-porphine tetra-triflate salt;
5,10,15,20-tetrakis-(1-hydroxymethyl-4-pyridyl)-21H,23H-porphine tetra-p-tosylate salt;
5,10,15,20-tetrakis-[1 (2-hydroxyethyl)-4-pyridyl]-21H, 23H-porphine tetrachloride salt;
5,10,15,20-tetrakis-[1-(3-hydroxypropyl)-4-pyridyl]-21H, 23H-porphine tetra-p-tosylate salt;
5,10,15,20-tetrakis-[1 (2-hydroxypropyl)-4-pyridyl]-21H, 23H-porphine tetra-p-tosylate salt;
5,10,15,20-tetrakis-[1-(2-hydroxyethoxyethyl)-4-pyridyl]-21H,23H-porphine tetra-p-tosylate salt;
5,10,15,20-tetrakis-[1 (2-hydroxyethoxypropyl)-4-pyridyl]-21H,23H-porphine tetra-p-tosylate salt;
5,10,15,20-tetrakis-[4-(trimethylammonio)phenyl]-21H, 23H-porphine tetra-p-tosylate salt;
5,10,15,20-tetrakis-[4-(trimethylammonio)phenyl]-21H, 23H-porphine tetrachloride salt;
5,10,15,20-tetrakis-[4-(trimethylammonio)phenyl]-21H, 23H-porphine tetrabromide salt;
5,10,15,20-tetrakis-[4-(trimethylammonio)phenyl]-21H, 23H-porphine tetra-acetate salt;
5,10,15,20-tetrakis-[4-(trimethylammonio)phenyl]-21H, 23H-porphine tetra-perchlorate salt;
5,10,15,20-tetrakis-[4-(trimethylammonio)phenyl]-21H, 23H-porphine tetrafluoroborate salt;
5,10,15,20-tetrakis-[4-(trimethylammonio)phenyl]-21H, 23H-porphine tetra-triflate salt;
meso-(N-methyl-X-pyridinium)$_n$(phenyl)$_4$-n-21H,23H-porphine tetra-p-tosylate salt, where n is an integer of value 0,1,2, or 3, and where X=4-(para),3-(meta), or 2-(ortho) and refers to the position of the nitrogen in the pyridinium substituent, prepared as described, for example, by M. A. Sari et al. in Biochemistry, 1990, 29, 4205 to 4215;
meso-tetrakis-[o-(N-methylnicotinamido)phenyl]-21H, 23H-porphine tetra-methyl sulfonate salt, prepared as described, for example, by G. M. Miskelly et al. in Inorganic Chemistry, 1988, 27, 3773 to 3781;
5,10,15,20-tetrakis-(2-sulfonatoethyl-4-pyridyl)-21H,23H-porphine chloride salt, prepared as described by S. Igarashi and T. Yotsuyanagi in Chemistry Letters, 1984, 1871;
5,10,15,20-tetrakis-(carboxymethyl-4-pyridyl)-21H,23H-porphine chloride salt
5,10,15,20-tetrakis-(carboxyethyl-4-pyridyl)-21H,23H-porphine chloride salt
5,10,15,20-tetrakis-(carboxyethyl-4-pyridyl)-21H,23H-porphine bromide salt
5,10,15,20-tetrakis-(carboxylate-4-pyridyl)-21H,23H-porphine bromide salt, prepared as described by D. P. Arnold in Australian Journal of Chemistry, 1989, 42, 2265 to 2274;
2,3,7,8,12,13,17,18-octa-(2-hydroxyethyl)-21H-23H-porphine;
2,3,7,8,12,13,17,18-octa-(2-hydroxyethoxyethyl)-21H-23H-porphine;
2,3,7,8,12,13,17,18-octa(2-aminoethyl)-21H-23H-porphine;
2,3,7,8,12,13,17,18-octa-(2-hydroxyethoxypropyl)-21H-23H-porphine, and the like, as well as mixtures thereof.

Also suitable for use with the present invention are dansyl compounds, including: dansyl-L-alanine; a-dansyl-L-arginine; dansyl-L-asparagine; dansyl-L-aspartic acid; dansyl-L-cysteic acid; N,N'-di-dansyl-L-cystine; dansyl-L-glutamic acid; dansyl-L-glutamine; N-dansyl-trans-4-hydroxy-L-proline; dansyl-L-isoleucine; dansyl-L-leucine; di-dansyl-L-lysine; N-ε-dansyl-L-lysine; dansyl-L-methionine; dansyl-L-norvaline; dansyl-L-phenylalanine; dansyl-L-proline; N-dansyl-L-serine; N-dansyl-L-threonine; N-dansyl-L-tryptophan; O-di-dansyl-L-tyrosine monocyclohexylammonium salt; dansyl-L-valine; dansyl-γ-amino-n-butyric acid; dansyl-DL-a-amino-n-butyric acid; dansyl-DL-aspartic acid; dansyl-DL-glutamic acid; dansylglycine; dansyl-DL-leucine; dansyl-DL-methionine; dansyl-DL-norleucine; dansyl-DL-norvaline; dansyl-DL-phenylalanine; dansylsarcosine N-dansyl-DL-serine; N-dansyl-DL-threonine; N-α-dansyl-DL-tryptophan; dansyl-DL-valine dansyl-DL-α-aminocaprylic acid cyclohexylamine salt;
(dansylaminoethyl)trimethylammonium perchlorate; didansylcadaverine;
monodansylcadaverine; dansylputrescine; dansylspermidine; didansyl-1,4-diaminobutane; didansyl-1,3-diaminopropane; didansylhistamine, all available from Sigma Chemical Corp., St. Louis, Mo., and the like, as well as mixtures thereof.

Additional light sensitive compounds may also include an organic/inorganic pigment as described in U.S. Pat. No. 5,367,005 or any compound or compound combination of phenoxazine derivatives as described in U.S. Pat. No. 4,540,595, which is hereby incorporated by reference.

Figure 6:
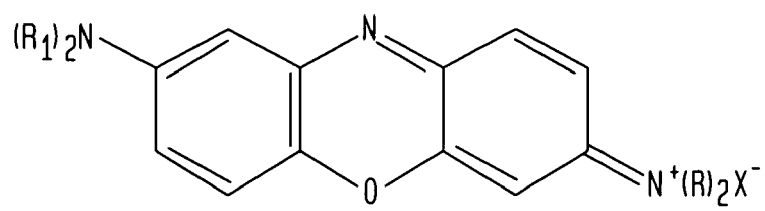

The general chemical formula of the phenoxazine compounds is shown in FIG. 6 in which $R_1$ and $R_2$ are alkyl groups and $X^-$ is an anion.

Additional light sensitive compounds of the present invention may be classified in one of the following four groups depending upon excitation and emission regions, as described in U.S. Pat. No. 4,598,205, which is hereby incorporated by reference.

(a) Excitation UV—Emission UV
(b) Excitation UV—Emission IR
(c) Excitation IR— Emission UV
(d) Excitation IR— Emission IR Also useful with the present invention is any compound or compound combination of organic infrared fluorescing compound that is soluble in the ink vehicle disclosed in U.S. Pat. No. 5,093,147, which is hereby incorporated by reference. Such light sensitive compounds include: (3,3'-Diethylthiatricarbocyanine Iodide); (3,3'-Diethyl-9, 11-neopentylenethiatricarbocyanine Iodide); (1,1', 3,3,3',3'-Hexamethyl-4,4',5,5'-dibenzo-2,2'-indotricarbocyanine Iodide); (Hexadibenzocyanine 3); 1H-Benz[e]indolium, 2-[7-[1,3-dihydro-1,1-dimethyl-3-(4-sulfobutyl)-2H-benz[e]indol-2-ylidene]-1,3,5-hepatrienyl]-1,1-dimethyl-3-(4-sulfobutyl-, sodium salt; (3,3'-Diethyl-4,4',5,5'-dibenzothiatricarbocyanine Iodide)(Hexadibenzocyanine 45); Benzothiazolium, 5-chloro-2[2-[3-[5-chloro-3-ethyl-2(3H)-benzothiazolylidene-ethylidene]-2-(diphenylamino)-1-cyclopenten-1-yl]ethyl]-3-ethyl-, perchlorate; (1,1'-Diethyl-4,4'-dicarbocyanine Iodide); Naphtho[2,3-d]thiazolium, 2-[2-[2-(diphenylamino)-3-[[3-(4-methoxy-4-oxobutyl)naptho[d] thiazol-2(3H)-ylidene-ethylidene]-1-cyclopenten-1-yl] ethenyl]3-(4-methoxy-oxobutyl)-, perchlorate.

The following light sensitive compounds may also be useful with the present invention: Sulfuric acid disodium salt mixture with 7-(diethylamino)-4-methyl-2H-1-benzopyran-2-one; 3',6'-bis(diethylamino)-spiro-(isobenzofuran-[(3H), 9'-(9H)xanthen)-3-one or 3',6'-bis(diethyl-amino)-fluoran; 4-amino-N-2,4-xylyl-naphthalimide; 7-(diethylamino)-4-methyl-coumarin; 14H-anthra[2,1,9-mna]thioxanthen-14-one; N-butyl-4-(butylamino)-naphthalimide.

In addition, the following compounds may also be used as light sensitive compounds with the present invention: 5-(2-Carbohydrizinomethyl thioacetyl)-aminofluorescein; 5-(4,6-dichlorotriazinyl)-aminofluorescein; Fluor-3-pentammonium salt; 3,6-diaminoacridine hemisulfate, proflavine hemisulfate; Tetra(tetramethylammonium salt; Acridine orange; BTC-5N; Fluoresceinamine Isomer I; Fluoresceinamine Isomer II; Sulfite blue; Coumarin diacid cryptand[2,2,2]; Eosin Y; Lucifer yellow CH Potassium salt; Fluorescein isothiocyanate (Isomer I); Fluorescein isothiocyanate (Isomer II); Fura-Red, AM; Fluo-3 AM; Mito Tracker Green FM; Rhodamine; 5-carboxyfluorescein; Dextran Fluroscein; Merocyanine 540; bis-(1,3-diethylthiobarbituric acid trimethine oxonol; Fluorescent brightner 28; Fluorescein sodium salt; Pyrromethene 556; Pyrromethene 567; Pyrromethene 580; Pyrromethene 597; Pyrromethene 650; Pyrromethene 546; BODIPY 500/515; Nile Red; Cholesteryl BODIPY FL C12; B-BODIPY FL C12-HPC; BODIPY Type D-3835; BODIPY 500/510 C5-HPC; IR-27 Aldrich 40,610-4; IR-140 Aldrich 26,093-2; IR-768 perchlorate Aldrich 42,745-4; IR-780 Iodide Aldrich 42,531-1; IR-780 perchlorate Aldrich 42-530-3; IR-786 Iodide Aldrich 42,413-7; IR-786 perchlorate Aldrich 40,711-9; IR-792 perchlorate Aldrich 42,598-2; 5-(and-6)-carboxyfluorescein diacetate; 6-caroxyfluorescein Sigma; Fluorescein diacetate; 5-carboxyfluorescein diacetate; Fluorescein dilaurate; Fluorescein Di-b-D-Galactopyranoside; FluoresceinDi-p-Guanidinobenzoate; Indo I-AM; 6-caroxyfluorescein Diacetate; Fluorescein thiosemicarbazide; Fluorescein mercuric acetate; Alcian Blue; Bismarck Brown R; Copper Phthalocyanine; Cresyl Violet Acetate; Indocyanine Green; Methylene Blue; Methyl Green, Zinc chloride salt Sigma; Oil Red 0; Phenol Red Sigma; Rosolic Acid; Procion Brilliant Red; Ponta Chrome Violet SW; Janus Green Sigma; Toluidine Blue Sigma; Orange G; Opaque Red; Mercuric Oxide Yellow; Basic Fuchsin; Flazo Orange; Procion Brilliant Orange; 5-(and-6)-carboxy-2',7'-dichlorofluorescein; 5-(and-6)-carboxy-4',5'-dimethyl fluorescein; 5-(and-6)-carboxy-2',7'-dichlorofluorescein diacetate; Eosin-5-maleimide; Eosin-5-Iodoacetamide; Eosin Isothiocyanate; 5-Carboxy-2',4',5',7'-tetrabromosulfonefluorescein; Eosin thiosemicarbazide; Eosin Isothiocyanate Dextran 70S; 5-((((2-aminoethyl)thio)acetyl)amino) fluorescein; 5-((5-aminopentyl)thioureidyl)fluorescein; 6-carboxyfluorescein succinimidyl ester; 5,5'-dithiobis-(2-nitrobenzoic acid); 5-(and-6)-carboxyfluorescein succinimidyl ester; Fluorescein-5-EX, succinimidyl ester; 5-(and-6-)-carboxy SNARF-1; Fura Red, Tetrapotassium salt; Dextran fluoroscien, MW 70000; 5-(and-6-)-carboxynaphthafluorescein mixed isomers; Rhodol green, carboxylic acid succinimdyl ester; 5-(and-6-)-carboxynaphthafluorescein SE mixed isomers; 5-carboxyfluorescein, SE single isomer; 5-(and-6)-carboxy-2',7'-dichlorofluorescein diacetate, SE; 5-(and-6)-carboxy-SNAFL-1, SE; 6-tetramethylrhodamine-5- and -6-carboxamido hexanoic acid, SE; Styryl Compound (4-Di-1-ASP); Erythrosin-5-isothiocyanate; Newport green, dipotassium salt; Phen green, dipotassium salt; Bis-(1,3-dibutylbarbituric acid0 trimethine oxonol; lucigenin(bis-N-methyl acridinium nitrate, tetrakis-(4-sulfophenyl) porphine; tetrakis-(4-carboxyphenyl) porphine; anthracene-2,3-dicarboxaldehyde, 5-((5-aminopentyl)thioureidyl) eosin, hydrochloride, N-(ethoxycarbonylmethyl)-6-methoxyquinolinium brimide; MitoFluor green; 5-aminoeosin, 4'(aminomethyl)fluorescein; hydrochloride; 5'(aminomethyl)fluorescein, hydrochloride; 5-(aminoacetamido)fluorescein; 4'((aminoacetamido) methyl) fluorescein; 5-((2-(and-3)-S-(acetylmercapto)succinoyl)amino fluorescein; 8-bromomethyl-4,4-difluoro-1,3,5,7-tetramethyl-4-bora-3a, 4a,diaza-s-indacene; 5-(and-6)-carboxy eosin; cocchicine fluorescein; Casein fluorescein, 3,3'-dipentyloxacarbocyanine iodide; 3,3'-dihexyloxacarbocyanine iodide; 3,3'-diheptyloxacarbocyanine iodide; 2'-7'-difluorofluorescein; BODIPY FL AEBSF; fluorescein-5-maleimide; 5-iodoacetamidofluorescein; 6-iodoacetamidofluorescein; Lysotracker green; Rhodamine 110; Arsenazo I; Aresenazo III sodium; Bismarck brown Y; Brilliiant Blue G; Carmine; b-carotene; Chlorophenol red; Azure A; Basic fuchsin; di-2-ANEPEQ; di-8-ANEPPQ; di-4-ANEPPS; and di-8-ANEPPS where ANEP(aminonaphthylethenylpyridinium).

The spectral properties, such as wavelength or light emission, of the ink may change as a result of interactions between the light-sensitive compound and the ink. That is, the spectral properties of the light-sensitive compound may be different when in the presence of the ink. Thus, when tuning or formatting the probe assembly with appropriate light-emitting diodes and filters, this interaction should be taken into account, so that the probe assembly is capable of detecting the desired spectral properties of emitted light.

Similarly, the spectral properties may change as a result of interactions between the ink with the light-sensitive compound mixed therein and the product packaging itself or any background printing on the product packaging. Further, the spectral properties may change as a result of heating of the light-sensitive compound (with or without ink) as it is printed using an ink jet printer. Here again, these changes in spectral properties of the light-sensitive compound should be taken into account when tuning or formatting the probe assembly with appropriate light-emitting diodes and filters.

In one embodiment, to operate the device 20, the switch 34 is turned on to supply power to the device 20. Prior to scanning the product or product package, the device 20 may self-calibrate by detecting the amount of background light surrounding the probe assembly 24. To accomplish this, for example, the device compares the spectral properties of light received when the light source is off and when it is on. The ink sample on the product or product package to be authenticated may then be irradiated with an irradiating wavelength of light emitting from the light source. The light may then be filtered using the source filter to obtain desired wavelengths of light and focused by the lens onto the sample ink.

In one example of using a light-emissive compound, the irradiated light-emissive compound in the ink then emits a predetermined wavelength of light, based on the wavelengths of light being emitted from the light source as well as the particular light-emissive compounds used in the ink. Change in spectral properties, such as light emission, due to the presence of light-emissive compounds in the ink can be determined, from the formula $[(Fd-Fp)/Fd] \times 100$, where the light emission of the ink in the absence of light-emissive compound is Fp, and the light emission of the ink with the light-emissive compound is Fd. The light emission changes as a result of interactions of the light-emissive compound with the ink. The emission filters then filter undesired wavelengths of light emitting from the sample ink such that, for example, only peak wavelengths of light are passed through. The light is then directed to the optical detector 53, which then generates a voltage level indicative of the amount of light emitted from the sample ink. The device then converts the signal into a sample characteristic, which is then compared with a fingerprint of a standard to determine the authenticity of the sample ink. In one embodiment, an authentic sample is indicated when the value of the detected sample characteristic is within 10% of the value of the fingerprint. The device may then indicate whether the sample characteristic is authentic using any suitable indicating method. For example, the device may display a green color if the sample is authentic and a red color if the sample is not authentic.

It is to be appreciated that the intensity or quantity of light emission from the sample is detected. However, according to one aspect of the present invention, intensity decay or a change in the quantity of light emission over time may be used to provide the sample characteristic. Alternatively, any such combination may be used to provide the sample characteristic. As used herein, the term "light emission" means intensity or quantity or intensity decay or change in quantity of light emitted from the sample.

Rather than, or in addition to, comparing certain spectral properties such as light emission or absorption from the light-sensitive compound to a stored fingerprint, in some instances it may be desirable to compare a ratio of light emission or absorption of two different wavelengths of light to a stored ratio fingerprint. In one embodiment, this may be accomplished by providing a light-emissive compound that is capable of emitting two different peak wavelengths of light or, alternatively, providing two or more different light-emissive compounds, each producing a characteristic peak wavelength having a certain light emission. By using a ratiometric approach at two or more different wavelengths, it may be possible to verify the authenticity of a mark without requiring background compensation. A radiometric analysis may allow the device to simply measure the intensity at each of the wavelengths and ratio these two values without requiring that the spectra be resolved to baseline. This may allow the detector to simply ignore any background rather than account for it. If two or more light-sensitive compounds are used, each may be printed in one or more locations on the package, product, label or container.

In addition to using compounds that may emit at specific wavelengths in response to an excitation light source, the present invention may also employ compounds that absorb at specific wavelengths, as briefly discussed above. For example, the substrate being analyzed may be irradiated at a specific wavelength and reflect that same wavelength back to the detector. An area on the substrate may be covered by an absorbing compound that may absorb at the wavelength of the irradiating light and therefore be detected as an area of lower emission or reflectance than the surrounding area. Two or more absorbers may be used in a way similar to that used with emitters, as described above. In addition, absorbers may be used in conjunction with emitters.

In one embodiment, two or more light-emissive compounds with different emission wavelengths are added to the ink. The ink, together with the light-emissive compound or compounds, are printed onto the product or packages and appear as a single detectable bar code or message. Preferably, the ink is water insoluble.

With respect to the use of light-emissive compounds, the relative fluorescence from each light-emissive compound may be detected. The light-emissive compounds may be UV excitable compounds, IR excitable compounds or any combination thereof. For example, one UV excitable compound and one or more IR excitable compounds may be used. Alternatively, one IR excitable compound and one or more UV excitable compounds may be used. Also, two or more UV excitable compounds and two or more IR excitable compounds may be used. Thus, the range of emission wavelengths can range from about 300 nm to about 2400 nm.

Figure 7:
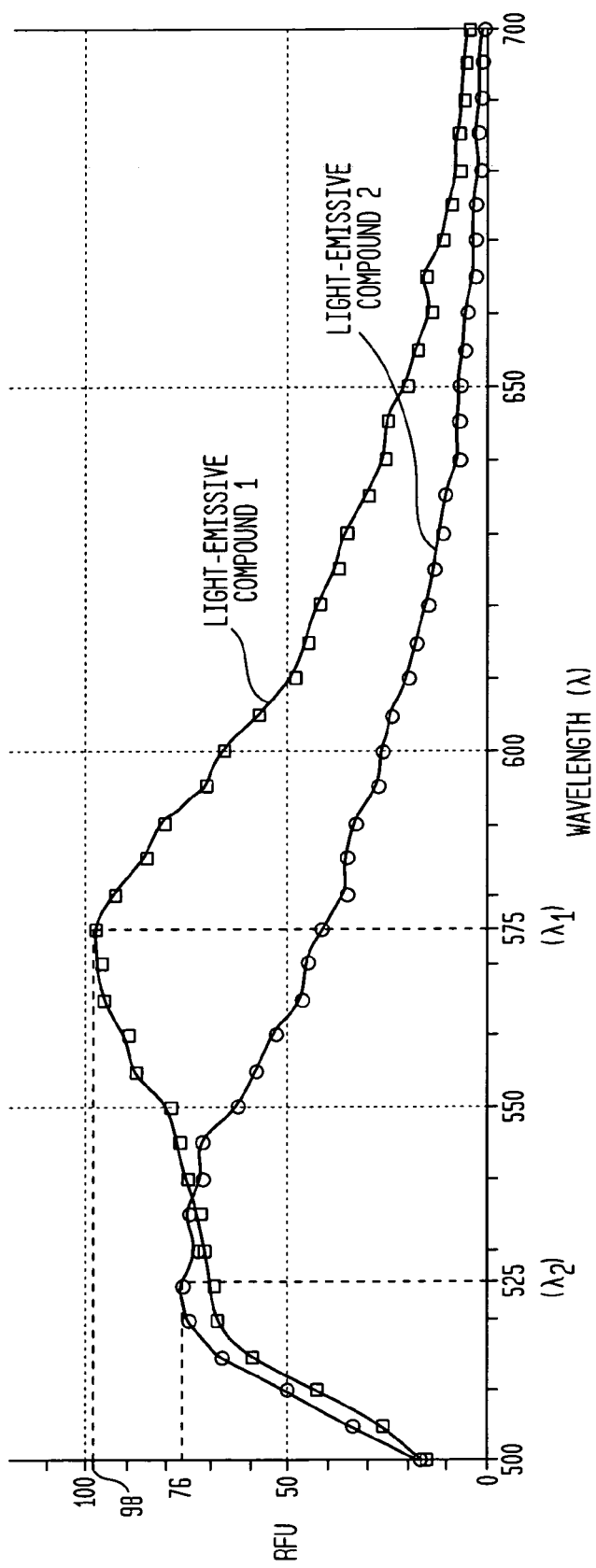
FIG. 7 is a graph representing light emission of two light-emissive compounds.

An example of such a ratio is shown in FIG. 7. Here, a ratio of the light emission for the peak wavelengths of two different light-emissive compounds is used in a comparison with a stored standard fingerprint. For example, two light-emissive compounds are mixed at a certain concentration with ink. An excitation wavelength of light of 485 nm is applied to the ink. Light-Emissive Compound 1 has a Relative Fluorescence Unit (RFU) of 98 at a peak wavelength ($\lambda_1$) of 575 nm and Light-Emissive Compound 2 has an RFU of 76 at a peak wavelength ($\lambda_1$) of 525 nm. The ratio of the RFU values at the peak wavelengths of 575 to 525 is approximately 1.3. This ratio of 1.3 may then be used in the comparison to the stored fingerprint ratio. Although Relative Fluorescence Units are used in this example to indicate the value of the amount of light emitted, other units may be used, such as photon count, for example.

In another embodiment, a ratio of the RFU of the excitation light may be used. Also, the ratio of any combination of the RFU of excitation light or light emitted from the light-emissive compound may be employed. As above, the ratio may be compared to a stored fingerprint ratio. For example, two light-emissive compounds are mixed at a certain concentration with ink. An excitation wavelength of light is applied to the ink. The light-emissive compound has an excitation RFU at the excitation wavelength and has an emission RFU at the emission wavelength. The ratio of the excitation RFU to the emission RFU is then compared to a stored fingerprint ratio. In another embodiment, the light-emissive compound has two discrete excitation RFU values. The ratio of the first excitation RFU value to the second excitation RFU value is then compared to a stored fingerprint ratio. As above, although Relative Fluorescence Units are used in this example to indicate the value of the amount of light, other units may be used, such as photon count, for example. The particular ratio (i.e., excitation RFU to emission RFU, excitation RFU to excitation RFU, or emission RFU to emission RFU) may be set by the manufacturer of the device or may be user selectable.

One such instance where it may be useful to compare the ratio arises due to the interaction of the ink with the light-sensitive compounds. Generally, the solvent used in the ink may tend to evaporate in use or before printing onto the product or product package. This may cause a change in the concentration of the light-emissive compound relative to the ink, thereby changing the excitation light or the light emission of the irradiated ink. However, if one or more light-emissive compounds are used excitable at or emitting at at least two peak wavelengths of light (or absorbing at two valleys, as may be the case with light-absorbing compounds), then the ratio may be used because the ratio remains constant or unaffected relative to solvent levels.

In another such situation, it may be desirable to allow would-be counterfeiters to identify and reproduce the unique authentication mark printed on the product or product package in an effort to trap would-be counterfeiters and effectively detect the presence of counterfeit products or product packages. Preferably, the authentication mark is visible or otherwise detectable using a conventional black light, thereby allowing the would be counterfeiter to reproduce the pattern of the authentication mark. However, unbeknownst to the would-be counterfeiter, the ink used for the reproduced authentication mark would not contain one or more of the proper light-emissive compounds. Thus, while the would-be counterfeiter may have taken comfort in reproducing the pattern of the authentication mark, the product or product package would be detected as a counterfeit. In this regard, with respect to the use of light-emissive compounds, the black light would excite one light-emissive compound to emit only one peak wavelength of light. However, the black light would be incapable of exciting the light-emissive compound (or another light-emissive compound) to emit the additional peak wavelength of light. Alternatively, the black light may excite another light-emissive compound, however, the emission wavelength of that compound may not be visible. As a result, the would-be counterfeiter would not recognize the additional wavelength of light emitted and therefore would not correctly reproduce the ingredients (i.e., light-emissive compounds and/or ink) used for the authentication mark. The device 20 of the present invention, on the other hand, would readily detect the counterfeit product or product package due to the improper formulation of the ink. Detecting such a ratio may also be preferable when the light-emissive compounds are placed on an optical disk. This ratio may be changed during manufacture of the product, for example the optical disk, by varying blends and/or intensities of the light-emissive compounds.

The ratiometric analysis of the present invention allows the number of fingerprint emission profiles to be greatly increased over the number of profiles that can be created simply by detecting the presence of one or more light-sensitive compounds in an ink. For instance, two specific light-sensitive compounds may be assigned to authenticate a specific product line. However, within that product line, variables such as place of origin, date of production, or place of distribution may be further defined by varying the ratio of the two light-sensitive compounds that are used in the authenticating mark. In this manner, a particular light-sensitive compound or group of light-emissive compounds may be uniquely assigned to a specific company or product line, and the user of that combination of light-sensitive compounds can be assured that the same combination is not being used by others. Alternatively, a certain range of ratios for a specific combination of light-sensitive compounds may be assigned to a particular product line, division, or company.

In yet another situation, the use of the ratio allows the device 20 to be self-calibrating for surrounding light temperature and other conditions, in addition to the self-calibration procedure discussed above. The device may also compensate for degradation of the light source, the electronics or the optical detector, for example. While the light emission (or absorption) or detection thereof of a single wavelength of a light-sensitive compound may change due to the above noted factors, the ratio of light emission (or absorption) or excitation between two wavelengths of the light-sensitive compound remains relatively constant. Thus, during on-site measurements, this ratio may be used, rather than the actual value, to determine whether the suspect product or product package is authentic. Any variability due to a comparison of on-site data with stored data is therefore removed.

In order to further reduce the variability of on-site data when compared with stored data, it may be preferable when using more than one light-sensitive compound to use groups of compounds that exhibit similar degradation characteristics. For example, if one light-sensitive compound degrades at the rate of 10% per year under normal storage conditions, the companion light-sensitive compound or compounds may be chosen based on a similar 10% degradation factor. By using ratiometric analysis in combination with absolute readings obtained from an authentication mark, it may be possible to not only authenticate a product or product package but to also retrieve data that indicate under what conditions the product may have been stored. For example, if a greater amount of degradation is detected than would be expected, this may be an indication that the product or package has been stored at elevated temperatures or in direct sunlight.

It is also to be appreciated that the sampling rate may be changed such that a plurality of sample readings are taken on a specific ink sample. In a preferred embodiment, about 10,000 readings are taken. Thus, a high degree of confidence may be obtained in providing the sample characteristics. To further increase the level of confidence in detecting authenticity, the light emission (or absorption), the light emission (or absorption) ratio of more than one wavelength, and the particular pattern of the authenticating mark, if printed as other than the bar code, having a very high number of data points, may each be compared to the standard fingerprint.

Figure 8:
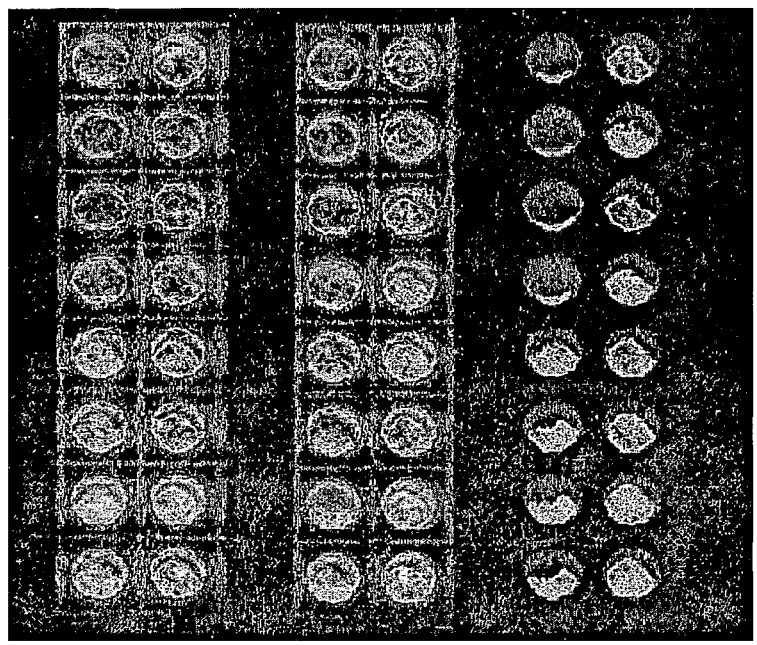
FIG. 8 is a diagrammatic representation of patterns used to identify authenticity marks.

With such a large amount of data generated, although possible, conventional data analysis comparing one or two variables at a given time, is not practical. Thus, according to one aspect of the invention, multivariable analysis or multivariable pattern recognition may be used. In a preferred embodiment, Tukey's analysis and Principle Component Analysis (PCA) are used. Other multivariable techniques that may be utilized include Hierarchical Cluster Analysis, K Nearest Neighbor, Pineapple Component Regression, Partial Least Squares Regression, and Soft Independent Modeling of Class Analogy (SIMCA). These multivariable techniques reduce the dimensionality of the data to two or three dimensions, allowing for patterns or relationships to be generated. An example of such a pattern generation is shown in FIG. 8. These generated patterns may then be compared to digitally-captured plate images. It is to be appreciated that the patterns may include both structure and color.

Figure 9:
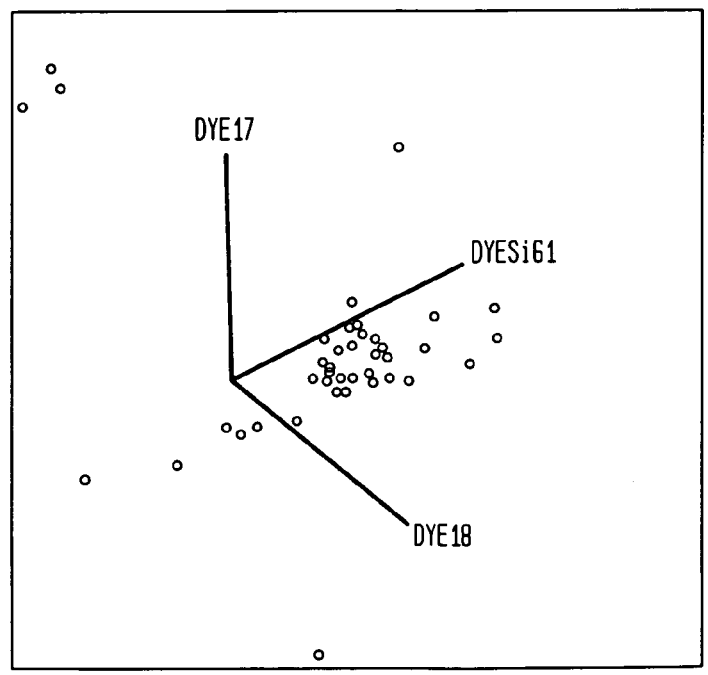
FIG. 9 is a 3-dimensional plot summarizing the similarities and differences among the samples being analyzed relative to a stored standard.

Analysis of the data may also be performed by developing plots having distinct clusters summarizing the similarity and differences among the samples being analyzed to a stored standard. Such analysis may be performed in addition to or in the alternative to the above mentioned multivariable or multivariable pattern recognition. An example of such a plot is shown in FIG. 9. Alternatively, rather than displaying the data as plots, the data may be presented in tabular form of the display of the device 20.

In one embodiment, the probe assembly 24 may be tuned or formatted to detect the presence of specific light-sensitive compounds as desired. Accordingly, referring again to FIG. 2, the body 40 of the probe assembly 24 has receptacles 90a and 90b, each adapted to interchangeably receive one of a plurality of different light sources such as different light-emitting diodes. Similarly, the body 40 may include other receptacles (not shown) adapted to interchangeably receive one of a plurality of different source filters as well as one of a plurality of emission filters. It should be appreciated that the light sources must emit a wavelength of light that will cause the light-sensitive compound added to the ink to generate characteristic spectral properties such as a characteristic wavelength of light. Thus, the type of light-emitting diode required depends upon the light-sensitive compound selected for use. Similarly, the filters (the source filters and emissions filter) should correspond to the particular light-emitting diode selected or to the selected emission (or absorption) wavelength.

It is to be appreciated that the particular light-sensitive compound or compounds printed on the product or product package may be selected based upon the light emitted from a standard optical scanner. In this regard, a particular light-sensitive compound or compounds may be used when printing the bar code on a product package or label that is capable of being scanned by a conventional scanner used at check-out counters at retail stores, for example. These scanners therefore can not only can read product information from the bar code, as is typically performed, but also can scan the product or product package for authenticity or other desired information generated by the light emission or absorption from the light-sensitive compound or compounds.

Figure 10:
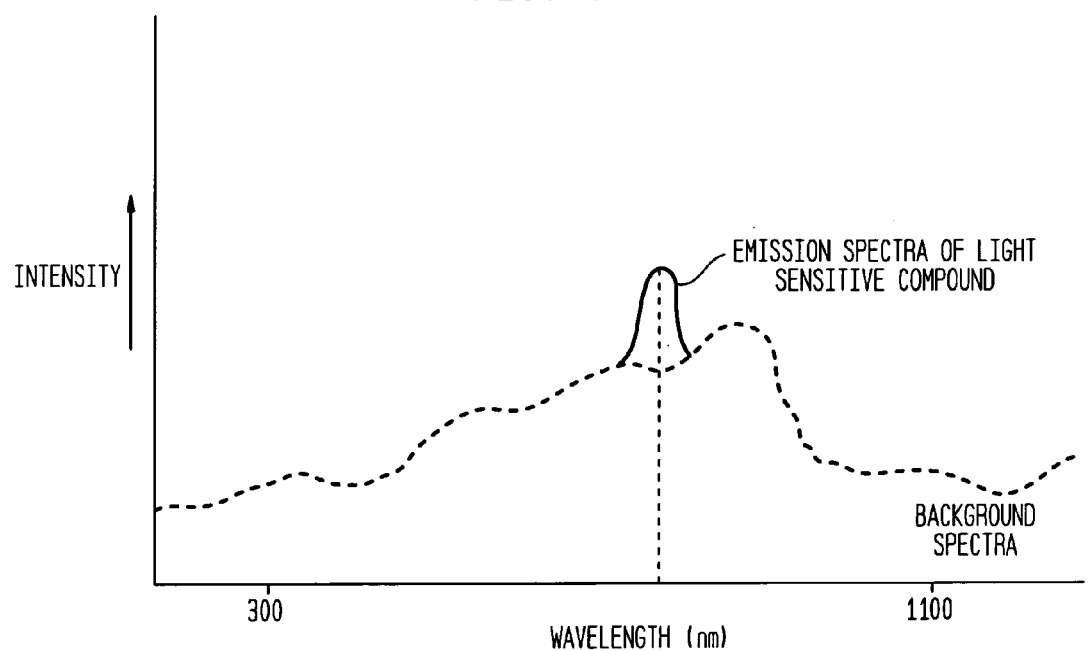
FIG. 10 is a graph representing selection of light-sensitive compounds according to one aspect of the present invention.

FIG. 10 illustrates an example of a background spectra that may be detected after a substrate is irradiated with light of a specific wavelength that is being proposed as an excitation wavelength for use with the invention. Once the background spectra has been determined, appropriate light-sensitive compounds may be chosen by selecting those that emit primarily at wavelengths that will not correspond directly with the peaks presented in the background spectra. Preferably, the light-sensitive candidates are chosen so that their peak emission wavelengths do not correspond with a peak in the background spectra and, most preferably, the candidates are chosen so that their spectra are easily resolvable from the background spectra.

After a group of candidate light-sensitive compounds has been chosen, the compounds may be applied to the substrate being tested, and the substrate may again be illuminated at the proposed excitation wavelength. As interactions between the light-sensitive compounds and the ink, or between the light-sensitive compounds and the substrate, may result in a shift in the wavelength that is emitted by the light-sensitive compounds, the selection of these compounds may be further refined after completion of the analysis with the candidate compounds having been applied to the substrate at appropriate concentrations.

Figure 11:
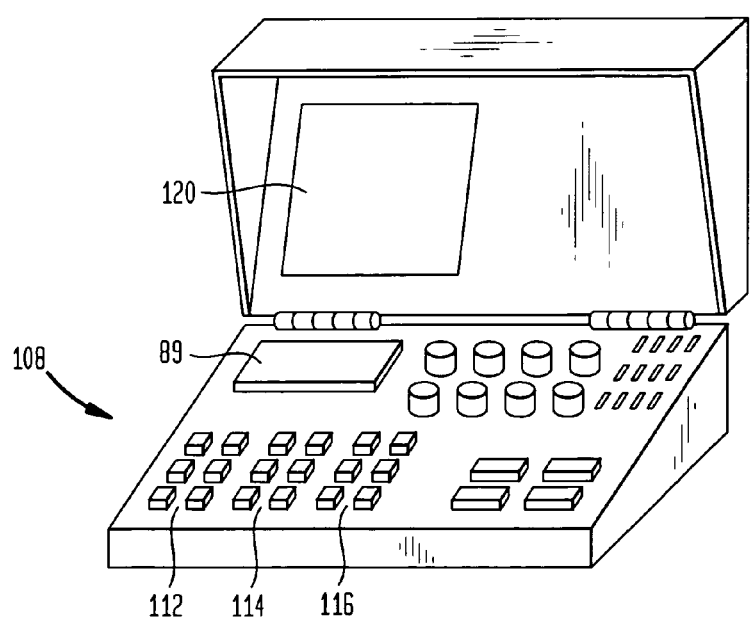
FIG. 11 is a diagrammatic representation of another embodiment of the portable device.
Figure 12:
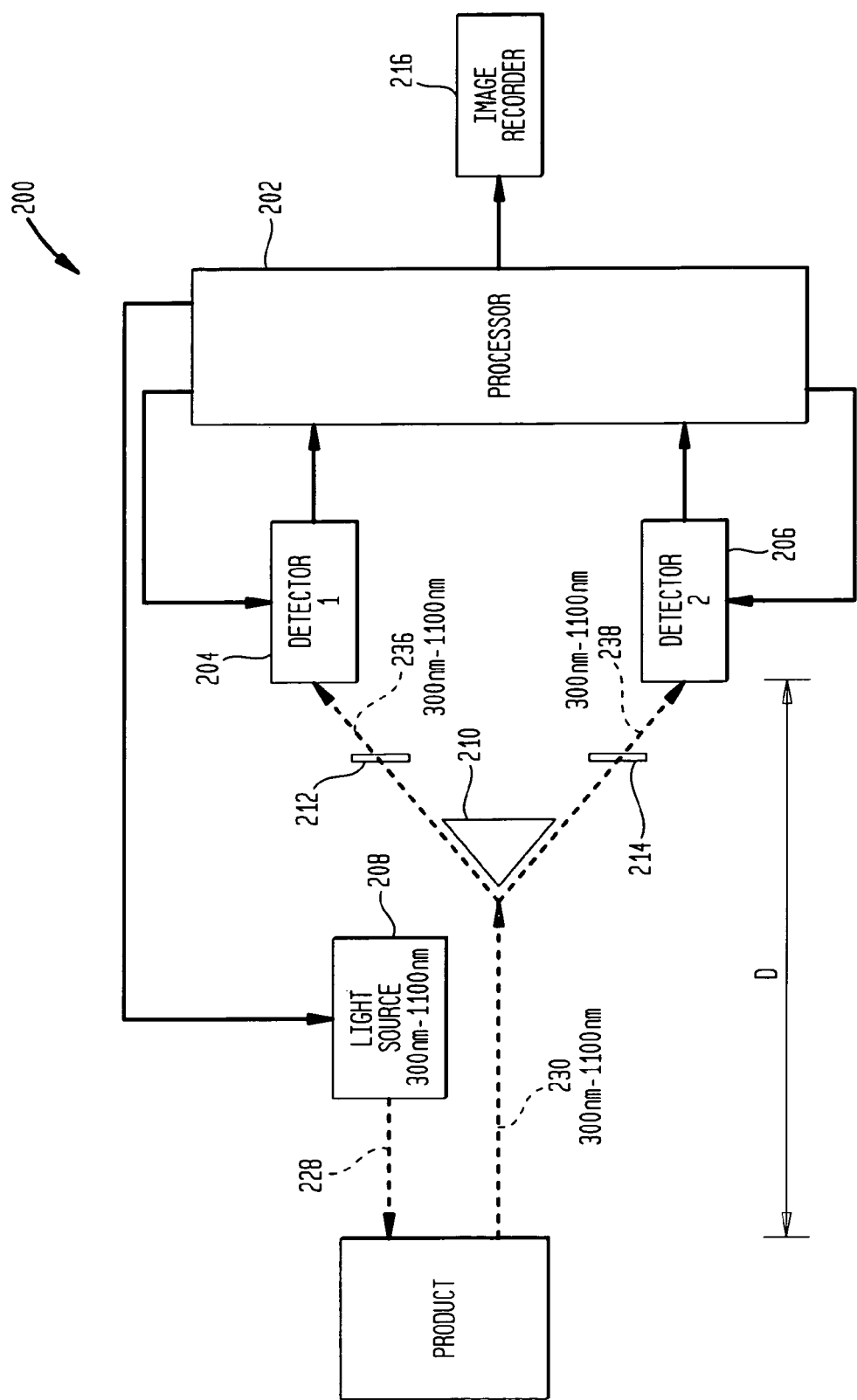
FIGS. 12–16 are schematic diagrams of another embodiment of the portable device.
Figure 13:
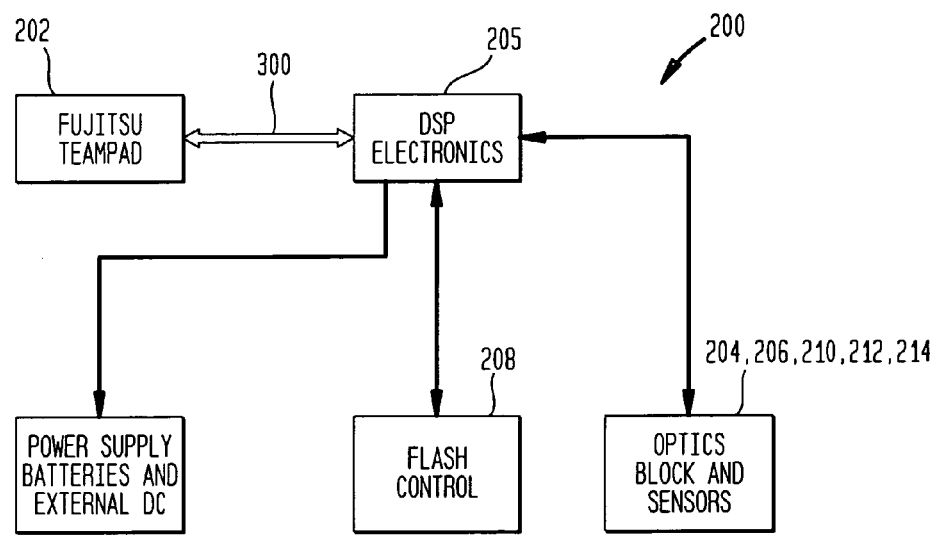
Figure 14:
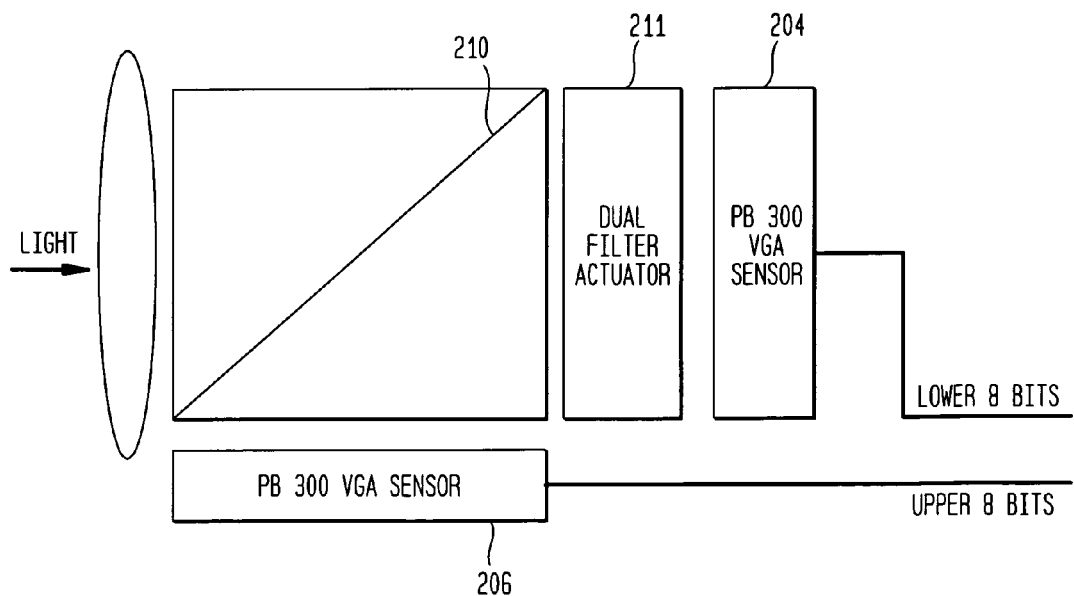
Figure 15:
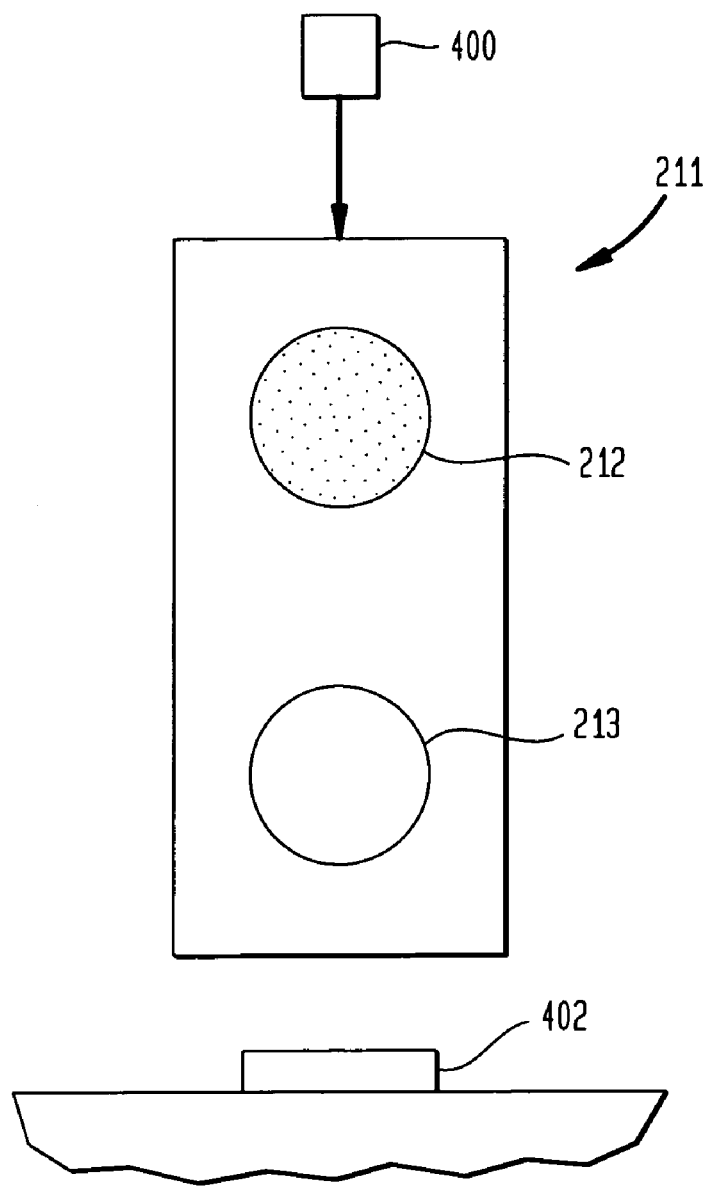
Figure 16:
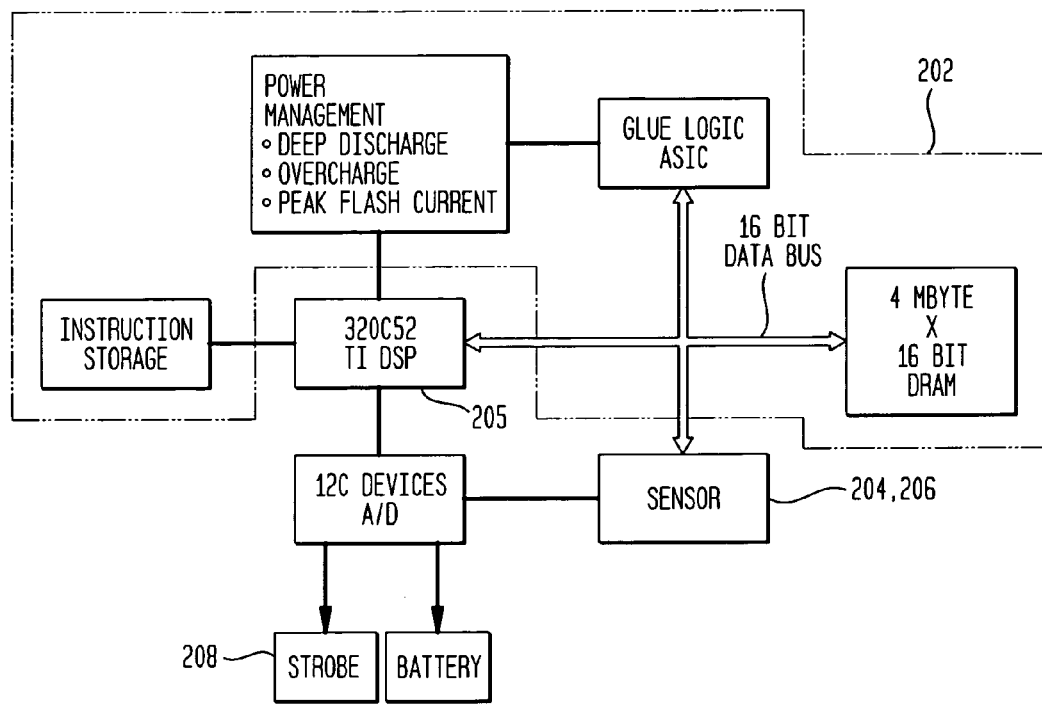

In another embodiment of the present invention, as shown in FIG. 11, a kit 108 for verifying the authenticity of a sample is provided. The kit may be packaged in a suitable carrying case 110 having a probe body 89 such that a plurality of light sources 112 together with corresponding source filters 114 and emissions filters 1116, respectively, are provided. A chart, database, spreadsheet, instructions or other source of information 120 may be provided indicating corresponding light sources and filters as a function of the sample product package to be tested. Alternatively, the components of the kit may be stored in the base 22 of device 20 and the instructions or other source of information may be stored in the PALM PILOT®, for example.

Although the light-emitting diode, source filter, and emissions filter may be interchangeable into the probe assembly, it is to be appreciated that an entire probe assembly having discrete components (light-emitting diode, source filter, emissions filter) may be provided. Thus, a plurality of different probe assemblies having different combinations of light-emitting diodes, source filters, and emissions filters may be provided. In such a situation, a probe assembly configured to detect or authenticate a product or product package of one manufacture may not be capable of authenticating a product or product package of a different manufacturer. In addition, a separate probe assembly may be provided that is capable of coupling to and working with the device 20 to determine the authenticity of a sample product, such as the probe assembly described in co-pending U.S. patent application Ser. No. 09/232,324 or to the microplate reader described in co-pending U.S. patent application Ser. No. 09/428,704 and incorporated herein by reference. In this regard, according to one aspect of the present invention, the device 20 is capable of authenticating both the product package and the product when it is required that the product be mixed with the light-emissive compound immediately prior to scanning.

Thus, one or more of the following criteria preferably need be present for a determination that the sample is authentic: the wavelengths emitted or absorbed by the light-sensitive compounds should be the wavelengths that are expected; the excitation wavelength should be the excitation wavelength expected; and the ratio of the luminance of the light-emissive compounds should be the ratio expected, or at least within a certain error of the ratio. If one of these three criteria is not met, the light-sensitive compound and therefore the sample, may be considered to be not authentic.

Turning now to FIGS. 12–16, schematic diagrams of another embodiment of the portable device are shown. The device incorporates similar components and similar authenticating detection techniques as described above and only those aspects of the invention that differ significantly will be more fully described below. The device 200 includes a processor 202, such as a Fujitsu Teampad, coupled to an image capture system via a parallel port. The image capture system includes a signal processor, such as a digital signal processor (DSP), two detectors 204, 206, such as that described above, and a flash control system, such as light source 208. One DSP that may be used is model 320C52 from Texas Instruments, Dallas, Tex.

The processor 202 also provides a number of functions such as providing a user interface, which may include a display. The processor also accepts the images from the DSP, processes the images to distinguish the background from the fluorescent image, and colors the image in pseudo-colors to enable the user to distinguish the background from the fluorescent image. The processor 202 may employ a Windows 95 operating system, although other suitable operating systems may be employed.

The light source may be any suitable light source, including the laser or LEDs described above or any other suitable conventional light source and may be configured as a strobe light or a steadily burning light. In the embodiment shown, the light source emits light that impinges on the surface of the product or product package 220 that contains the light-emissive compound or compounds printed thereon. The light source may emit light of wavelengths ranging between about 300 nm and about 2400 nm. In one embodiment, the light source emits light in a direction that is substantially parallel to the emitted light, as shown.

In another embodiment, the light source is filtered with the use of a filter 227 to emit light of a certain wavelength, for instance, 488 nm. The light source may also be configured so that it emits at two or more distinct wavelengths, for example, at 488 and 900 nm. By implementing multiple excitation wavelengths, the group of suitable light-emissive compounds is increased and duplication of the authentifying mark is made even more difficult. In addition single compounds that emit at two or more different wavelengths in response to two or more excitation wavelengths may be used. As described above, the filter may be interchangeable.

The excitation light source may be of any intensity and may last for any duration. Preferably, the light source is of a high intensity to increase the intensity of the emission wavelengths from the light-sensitive compounds so that the emission (or absorption) wavelengths can be resolved from background emission (or absorption). This may also allow for detection from more than 6 inches away. Most preferably, the excitation light source is of sufficient intensity so that the resulting spectra may be measured at a distance, for example, up to 12 feet, without the need to compensate for background emission. In one embodiment, the spectra may be detected as a distance of up to four feet. In another embodiment, the spectra may be detected as a distance of up to six feet.

Preferably, the target substrate is illuminated at the excitation wavelength for a short duration. This allows for an adequate level of excitation of the compounds while minimizing external effects such as the effect that a bright flash may have those in the area where the analysis is taking place. For example, the substrate is illuminated at the excitation frequency for less than about a millisecond.

The device also may also includes a beam splitter 210, such as a prism, and optional emission filters 212, 214, such as those described above. An image recorder 216 may also be coupled the processor. The image recorder may include digital output that electronically captures and records the image detected by the detector. The image recorder may then display the image on a suitable display and may display the image in full color. Alternatively, or in addition, the image recorder may record the image, whether in color or not, on any suitable medium, such as digitally, magnetically or on film, such as instant film. A date and time stamp may also be provided by the processor and captured by the image recorder, which may then be recorded digitally, magnetically or on film.

To determine whether the product or package is authentic, the processor is actuated and a switch (not shown) is actuated. A live image of the sample may be displayed on a portion of the display and a captured image may be displayed on another portion of the display, which initially may be blank. The user may then frame the sample in the live image viewfinder. A trigger on the camera is pressed. This trigger causes the filter block 211 (see also FIG. 15) to move and a position sensor to be closed so that the flash is triggered.

Thereafter, light from the light source is emitted, shown at 228, and irradiates the sample to be authenticated. Light emitted from or absorbed by the light-sensitive compound or compounds is then detected by the detectors. Specifically, the emitted light, shown at 230, is then split into two beams, namely 232 and 234. Filter 212 allows light, shown at 236, of certain wavelength or wavelengths to pass through to the detector 204. Filter 214 allows light, shown at 238, of the same or different wavelength or wavelengths to pass through to the detector 206. When light of different wavelengths is detected by the respective detectors, the processor 202 may employ the above-mentioned ratio analysis in determining the authenticity of the sample.

The image may then be captured and may be transferred to the processor via the parallel port and displayed on the portion of the display reserved for the captured image. If the user is satisfied with the image, the user may activate an appropriate icon. The image is then transferred to a portion of the application that can process the image.

This processing is as described above. More specifically, the process comprises analyzing the luminance of each pixel to determine if it is greater than or less than a threshold. The threshold is determined by looking at all the pixels in the image and mapping a histogram of the luminance and finding a valley between two peaks. The peaks represent the brightest pixels of the foreground and the background. The valley is an arbitrary point between them. All pixels brighter than the threshold are considered to be the light-sensitive compound. The image is actually two images—one from each detector.

A resulting image may be resolved from the pixels that are brighter than the threshold at each of the wavelengths being detected. The image may be, for example, an alphanumeric image, a design, or a bar code. Anything that may be printed onto the substrate using a conventional ink may also be printed using an ink of the present invention and thus can be viewed after being resolved by the device. This facilitates the tracking of diverted goods or other gray market goods that may be printed with a legitimate authentication mark, but have been detected in unintended channels of distribution. Such information much be transmitted by the numbers, letters, or digital information contained in the printed image itself rather than in the spectrographic or ratiometric analysis of the ink. This may effectively provide the user with another channel of information that can be provided without being readily apparent. It may be preferable to individually code each single product or package that is produced. Thus, the present invention provides the security of a cloaked authentication mark and also provides the ability to individually identify a single product or package.

A sliding actuator 211 (see FIG. 15) that holds two filters 212, 213 is positioned in front of detector 204. Filter 213 is in place during live viewing and filters the infrared wavelengths from the spectrum of light fed to the detector. Filter 214 is in place when a snap shot of the sample is taken and matches the emission or absorption of one of the light-sensitive compounds. Filter 214 over the detector 206 matches the emission or absorption of the other light-sensitive compound. Preferably filters 214 and 206 are narrow band filters that allow the transmission of light of the wavelength being emitted or absorbed by the respective light-sensitive compound and filter out light at other wavelengths. The two images are analyzed together first to determine the peaks (or valleys) relating to the light-sensitive compound and second to determine the ratios of the luminance or absorption of the two light-sensitive compounds.

The device may employ signal processing for the determination of authenticity by assigning certain pass/fail criteria to the data collected. For example, a green color may be displayed if the sample is authentic and a red color may be displayed if the sample is not authentic. The background (all pixels whose luminance is less than the threshold) are set to a background color (i.e., blue). By using this technology, light-sensitive compounds emitting very close together (within 30 nm) can be used.

The device may also be capable of detecting the authenticity of the product under typical room conditions. Thus, in one embodiment, the light source is of sufficient character to allow the sample to be irradiated under typical room lighting. Also, in one embodiment, the detectors are of sufficient character to allow the sample to be imaged from a distance "D" of up to about twelve feet. The distance at which the sample may be imaged may also be a factor of the specific compound being used and the intensity of the irradiating light.

The device may be operated so that only one product or package is analyzed at a time or, because the device is capable of reading packages from a distance, several packages may be analyzed at once. If several packages are to be analyzed concurrently, the processor may be programmed to perform a ratiometric analysis of individual groupings rather than a single analysis of the image as a whole.

In one embodiment, as mentioned, the device may employ real-time imaging of the sample. A record of the image may then be made that is either a video recording, whether digital, on film or magnetic. Alternatively, or in addition, a snap shot of the image may be made as described above. It may be preferable to create both a digital image and a hard copy, such as film, of the image being recorded.

The above-mentioned and other features may be employed in the software and/or hardware of the device. Examples of such features include: recognition of barcodes printed with light-emissive compounds; recognition of the background of the printed area on the sample; separation of the background from the image to be authenticated; automatic display of the date and time, which preferably cannot be tampered; display of the product in real time; display of both product in light and with invisible code; resolution into two distinct excitation or emission peaks in the light-emissive compounds; display of correct ratios as a pseudo-color image; display of correct light-emissive compound in a distinct color from background; display of correct light-emissive compound in a distinct color from light-emissive compounds of other ratios; utilization of full touchpad display without the need for additional buttons; software can be set to read certain manufacturer specific wavelengths; utilization of image recognition capabilities; regulation of the phase light cycle on the flash to adjust to the light-emissive compounds; regulation of the effective aperture through sampling time; compensation for distance to adjust the flash intensity or aperture; compensation for ambient light to adjust the flash intensity and aperture (effective or real); calculation of absorbance at discrete wavelengths from 300 nm–2400 nm; control of the automatic focus on the camera; compensation for the change in the ratios due to distance from the source; compensation for differences in filter density; transmission of digital pseudo-color image, date and time by electronic or infrared ports; display of the number of flashes available at current charge levels; production of a tone when the correct ratios are detected; interfacing of the device with a personal digital assistant; changing of the detector head with a probe assembly described in co-pending U.S. Patent application Ser. No. 09/232,324 or the microplate reader described in co-pending U.S. patent application Ser. No. 09/428,704; provision of real time help menus for device use; display includes a single touch button to activate device; display has a single screen indicating correct ratio; link to the manufacturer specific data including, for example, inventory data to image, serial number, and barcode; display has a single touchpad button to adjust for distance, ambient light and signal strength; display can be used as a head up display; recordation of sequential images of a site to be reconstructed in 3D to be displayed later; display can be set to read at a distance of 0.5 inch to a projection distance; display can be set to read with a virtual reality visor in 3D; display has touchpad button defined at a 0.3–0.75 inches rectangular, circular or square, icons.

In another embodiment of the device, the device parameters and controls may be operated through the use of a touch screen that also serves as a screen for viewing the images. Various icons on the touchscreen may be used to control parameters such as recalling libraries of fingerprint profiles as well as controlling functions of the device such as flash intensity and shutter activation.

Figure 17:
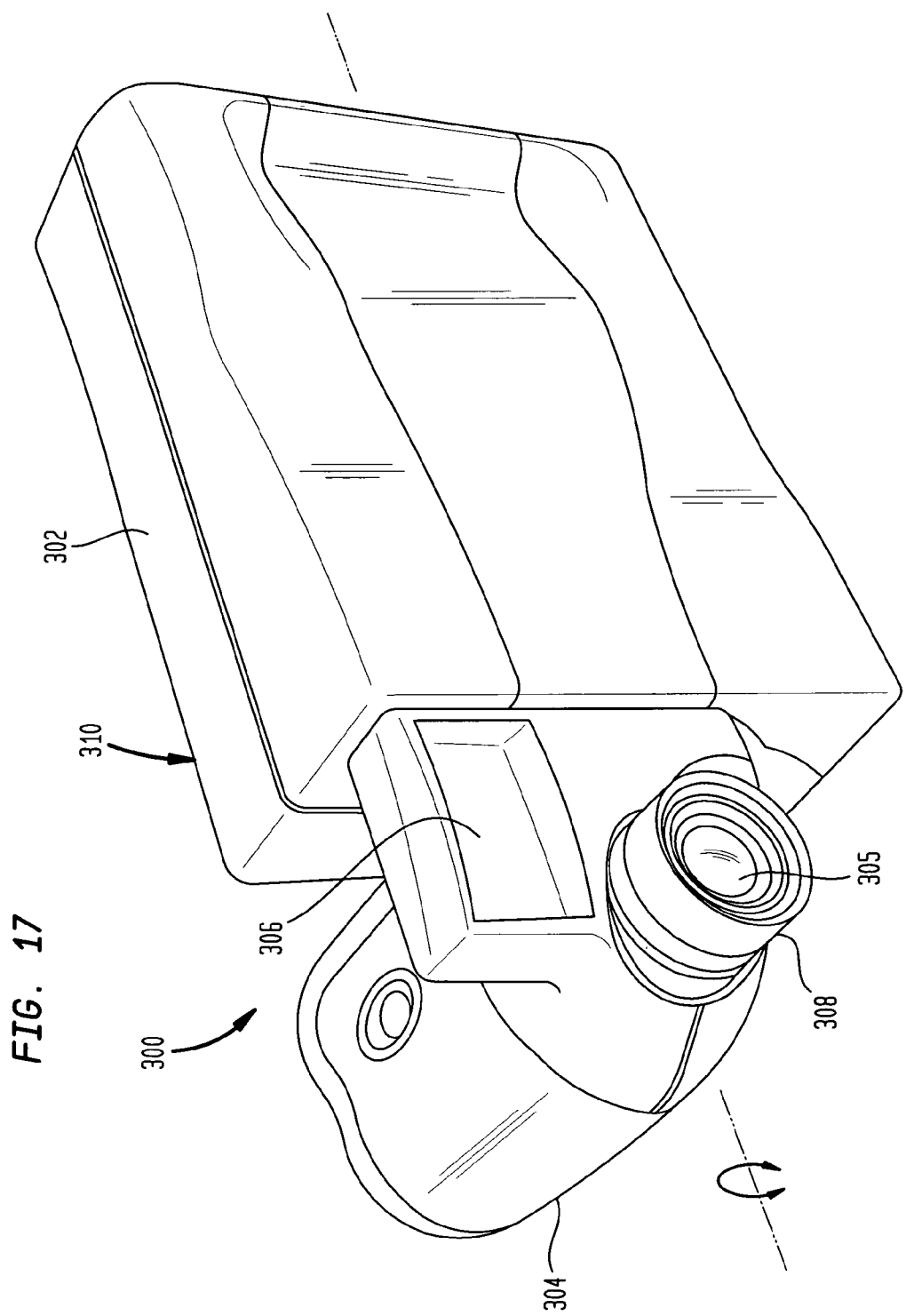
FIG. 17 is a perspective view of yet another embodiment.

Turning now to FIG. 17, a device 300 according to one aspect of the present invention is shown. The device 300 includes a processor section 302 and a detector section 304 swivably coupled to the processor section 302. The detector section 304 includes appropriate detector(s) 305 and may also include a suitable light source 306. The detector section 304 may also include a device 308 for allowing the detector(s) 305 to auto focus on the sample. The processor section 302 may include a display 310.

A system of the present invention may be implemented as shown in the embodiment below.

EXAMPLE 1

19 milligrams of a light-emissive compound that emits at 560 nm in response to an excitation wavelength of 488 nm is dissolved in 1 mL of methylethylketone (MEK). A second stock solution is made by dissolving 40 milligrams of a second light-emissive compound that emits at 900 nm in response to excitation at 488 nm into 1 mL of MEK. 3.5 milliliters of stock solution #1 and 2 milliliters of stock solution 2 are then mixed with 650 grams of chemical ink jet (CIJ) ink such as black ink #60-1 produced by, the Willett Corporation, of the United Kingdom. This water insoluble ink formulation is then placed in a chemical ink jet printer head. The ink jet printer is placed on a production line and is programmed to print a unique identifying mark on each product or package that passes down the production line. Downstream from the ink jet printer is a verification device that verifies that the proper ink has been applied adequately to the substrate. All products or packages that are verified correctly may then be packaged and shipped.

The packages may pass through various channels of distribution and are stocked for sale at a retail location. The manufacturer of the product may be interested in verifying that the products on display at the retail location are indeed genuine and have passed through the channels of distribution as intended. A representative of the manufacturer or distributor may enter the retail store and using any one of the devices described above, proceeds to analyze the packages to verify that they are authentic. The representative locates a package to be analyzed and chooses that same product from a menu that is available on the touchscreen display of the device, for example. After choosing the product from the menu, the representative points the device at the product to be tested and locates the product on the display. The operator of the device may indicate the approximate distance from the product or the distance may be determined by the device itself. The operator then indicates that it is time to capture an image by depressing a shutter button on the Analyzer. Alternatively, an icon on the touchscreen display may be used to commence the shutter sequence.

The device contains at least two different detectors, in this case, two CMOS detectors. While viewing the product in ambient light, an infrared filter is in place over each of the detectors to improve the quality of the image that is seen by the operator. These two infrared filters simultaneously slide away from in front of the CMOS detectors and are replaced by narrow-band bypass filters, one of which is designed to allow the passage of light at a peak wavelength of 560 nm and the second of which is designed to allow the passage of light at a peak wavelength of 900 nm. As the narrow band bypass filters slide into place, a circuit is completed that directs the light source to fire for a predetermined at a predetermined intensity. A filter between the light source and the target product package filters out most of the light except for that at a peak wavelength of 488 nm. The light-sensitive compounds on the package are excited by the light source and immediately emit at each of their respective emission wavelengths. A portion of this emitted light passes through a lens on the device and is split by a beam splitter which directs light at each of the two detectors. The filters in front of each of these detectors immediately reverse their previous movement and the narrow band wavelength filters, specific for each detector, are replaced with the infrared filters so that a real time, visible light image of the product remains available.

A Texas Instruments model 320C52 Digital Signal Processor receives the input signal from each of the CMOS detectors and proceeds to process the signal. The processor then analyzes the luminance of each pixel from the first detector and a histogram is plotted of the luminance from 0 up to the maximum value detected. If the light-sensitive compound is present on the package, the histogram should show a peak of some pixels at very high luminance and a large group of pixels at low luminance. A valley in the histogram is formed between these two peaks, and a point in this valley is chosen as a threshold luminance value for that detector. The processor then groups all of the pixels that exhibited luminance above this threshold value. The same analysis procedure is repeated by the processor for the second detector at the second wavelength. Once a group of pixels from each of the detectors has been classified as above a threshold luminance, an image may be formed from those pixels that emit above the threshold luminance at each of the wavelengths. In this way, an image of the ink is formed only in those sections where each of the emissive inks is in adequate concentration to provide a positive response. The processor determines a ratio of the luminance in the image area at the first wavelength compared to the luminance for the second wavelength of pixels in the same image. A ratio may be determined on a pixel by pixel basis and then averaged or, alternatively, may be determined for the image as a whole. Once an overall ratio has been determined, it is compared to the known ratio of the emissive compounds contained in the ink when applied to the package or product. If the newly determined ratio falls within a specific error amount, for example 10%, of the predetermined ratio, the authentication mark may be considered genuine if the proper excitation wavelength was employed and if the two emission wavelengths were the expected wavelengths. In this case, the device may indicate to the user by any number of ways that the product is indeed authentic. For example, the detected image may be displayed in green on the image of the product itself or a green light may be illuminated or an audio signal may be emitted. If the detected ratio is not within the error amount of the predetermined ratio, this is also indicated to the user, for example, by displaying the detected image in red. In one example, the image may include the serial number or other identifying alphanumeric image that relays any desired information to the representative. Thus, if the image appears in green, the user may read the package specific identifying alphanumeric image directly from the display on the device. In the same manner, if the device indicates that the product or package is not authentic, depending upon whether the counterfeiter has included an alphanumeric image, the representative is capable of readily determining the level of sophistication of the counterfeiter and may be and is apprised of what to look for on similar packages or products. That is, the counterfeiter may have correctly replicated the identifying mark (i.e., the alphanumeric image), yet has failed in providing an authentic indicia of the product or package.

Having thus described certain embodiments of the present invention, various alterations, modification and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalent thereof.

What is claimed is:

1. An authentication device for authenticating a mark on a substrate, the mark being of any desired pattern and including a light-sensitive compound that, when irradiated with IR light having a predetermined excitation wavelength in the IR range, emits IR light having a first predetermined emission intensity at a first predetermined emission wavelength in the IR range, with the first predetermined emission wavelength comprising any wavelength selected from a range of wavelengths between and including peak and non-peak emission wavelengths and with the predetermined excitation wavelength being different from the predetermined emission wavelength, with the first predetermined emission intensity comprising any intensity selected from a range of intensities between and including relatively high and low emission intensities, the device comprising:

a video mode comprising:
 a video mode detector for detecting an image of at least a portion of the substrate known to include the mark; and
 a video display for displaying the image; and a snapshot mode comprising:
 an IR light source adapted to irradiate the substrate, said IR light source producing IR light having the predetermined excitation wavelength in the IR range and irradiating the light-sensitive compound in the authentication mark with the IR light having the predetermined excitation wavelength so that the light-sensitive compound emits IR light having the first predetermined emission intensity at the first predetermined emission wavelength;

a filter disposed along a light path of the IR light having the first predetermined emission intensity at the first predetermined emission wavelength emitted from the light-sensitive compound, the filter allowing IR light having the first predetermined emission intensity at the first predetermined emission wavelength to pass through the filter while preventing other wavelengths of light from passing through the filter;

a snapshot mode detector comprising an IR light detector adapted to detect any IR light emission, said an IR light emission including light emission having the first predetermined emission intensity at the first predetermined emission wavelength in the IR range from the light-sensitive compound in the mark after the mark has been irradiated with IR light from the IR light source, the IR light detector adapted to provide data representative of the detected first predetermined emission intensity of IR light at the first predetermined wavelength from the light-sensitive compound in the mark;

a processor cooperating with at least the snapshot mode detector, the processor processing the data independent of the pattern of the mark, the processor comparing the data that is independent of the pattern of the mark to a standard and rendering an authentication signal based on the comparison; and a snapshot display for displaying the data and the authentication signal.

2. The device of claim 1 further comprising a storage medium for storing the data representative of the detected first predetermined emission intensity of IR light at the first predetermined wavelength from the light-sensitive compound in the mark.

3. The device of claim 2 wherein the storage medium comprises a storage medium capable of storing the data in a digital format.

4. The device of claim 2 wherein the storage medium comprises film.

5. The device of claim 2 further comprising at least one of a date and time stamp stored in the storage medium, the at least one of the date and time stamp representing a corresponding at least one of a date and time stamp when the device captured the mark.

6. The device of claim 1 wherein the IR light source comprises a flash.

7. The device of claim 1 further comprising a source filter disposed within a light path of the IR light source to allow at least the predetermined excitation wavelength of IR light to irradiate the mark.

8. The device of claim 7 wherein the source filter is interchangeable such that a source filter may be selected based upon the light-sensitive compound within the mark.

9. The device of claim 1 further comprising a touch screen for inputting commands to the device.

10. The device of claim 1 further comprising a display having at least a portion thereof that includes a split screen, with the video display comprising a first half of the split screen and with the snapshot display comprising the second half of the split screen.

11. The device of claim 1 wherein a predetermined color representing the mark is displayed on the snapshot display.

12. The device of claim 1 wherein the device first displays the image when in video mode, displays the mark when in the snapshot mode, then returns to display the image when in the video mode.

13. The device of claim 1 wherein the detected first predetermined emission intensity of IR light at the first predetermined wavelength is detected through a single optical path.

14. The device of claim 1 wherein the snapshot mode detector is adapted to be positioned away from the mark by a distance of as little as six inches.

15. The device of claim 1 wherein the at least one light-sensitive compound, when irradiated with IR light, emits IR light having a second predetermined emission intensity at a second predetermined emission wavelength in the IR range, wherein the snapshot mode detects the first predetermined emission intensity at the first predetermined emission wavelength and the second predetermined emission intensity at the second predetermined emission wavelength after the mark has been irradiated with IR light from the IR light source and wherein the data comprises a ratio of the first predetermined emission intensity to the second predetermined emission intensity or a ratio of the first predetermined emission wavelength to the second predetermined emission wavelength.

16. The device of claim 1 in combination with a mark, the mark comprising the at least one light-sensitive compound, wherein the mark is invisible to the naked eye and a user can only view the mark on the snapshot display.

17. The device of claim 1 wherein the snapshot mode detector is adapted to be positioned away from the mark by a distance of up to twelve feet.

18. An authentication device for authenticating a mark on a substrate, the mark including at least one light-sensitive compound that, when irradiated with IR light having a first predetermined excitation wavelength in the IR range, emits IR light having a first intensity at a first predetermined emission wavelength in the IR range and a second intensity at a second predetermined emission wavelength in the IR range, with the first and second predetermined wavelengths each comprising any wavelength selected from a range of wavelengths between and including peak and non-peak emission wavelengths and with the predetermined excitation wavelength being different from the first and second predetermined emission wavelengths, with the first and second predetermined emission intensities each comprising any intensity selected from a range of intensities between and including relatively high and low emission intensities, the device comprising:

a video mode comprising:
  a video mode detector adapted to detect an image of at least a portion of the substrate known to include the mark; and
  a video display adapted to display the image; and a snapshot mode comprising:
  an IR light source adapted to irradiate the mark, said IR light source producing IR light having the predetermined excitation wavelength in the IR range and irradiating the light-sensitive compound in the authentication mark with the IR light having the predetermined excitation wavelengths so that the light-sensitive compound emits IR light having the first and second predetermined emission intensities at the first and second predetermined emission wavelengths, respectively;

a filter disposed along a light path of the IR light having the first and second predetermined emission intensities and the first and second predetermined emission wavelength emitted form the light-sensitive compound, the filter allowing IR light having the first and second predetermined emission intensities at the first and second predetermined emission wavelengths, respectively, to pass through the filter while preventing other wavelengths of light from passing through the filter;

at least one snapshot mode detector comprising an IR light detector adapted to detect any IR light emission, said any IR light emission including IR light emission having the first predetermined emission intensity at the first predetermined emission wavelength and the second predetermined emission intensity at the second predetermined emission wavelength after the mark has been irradiated with IR light from the IR light source, the IR light decoder adapted to provide data representative of the detected first and second predetermined emmission intensities of IR light at the first and second wavelengths, respectively, from the light-sensitive compound in the mark;

a processor cooperating with at least the snapshot mode detector, the processor calculating a ratio of the first predetermined intensity to the second predetermined intensity or a ratio of the first predetermined wavelength to the second predetermined wavelength, comparing the ratio to a standard and thereafter rendering an authentication signal based on the comparison; and a snapshot display adapted to display the data and the authentication signal.

19. The device of claim 18, further comprising a storage medium adapted to store the data representative of the detected first predetermined emission intensity of IR light at the first predetermined wavelength and the second predetermined emission intensity of IR light at the second predetermined wavelength from the light-sensitive compound in the mark.

20. The device of claim 19, wherein the storage medium comprises a storage medium capable of storing the data in a digital format.

21. The device of claim 19, wherein the storage medium comprises film.

22. The device of claim 19, further comprising at least one of a date and time stamp stored in the storage medium, the at least one of the date and time stamp representing a corresponding at least one of a date and time stamp when the device captured the mark.

23. The device of claim 18, wherein the IR light source sources comprises a flash.

24. The device of claim 18, further comprising a source filter disposed within a light path of the IR light source adapted to allow at least the predetermined excitation wavelength of IR light to irradiate the mark.

25. The device of claim 24, wherein the source filter is interchangeable such that a source filter may be selected based upon the light-sensitive compound within the mark.

26. The device of claim 18, further comprising a touch screen adapted to accept input commands to the device.

27. The device of claim 18, further comprising a display having at least a portion thereof that includes a split screen, with the video display comprising a first half of the split screen and with the snapshot display comprising the second half of the split screen.

28. The device of claim 18, wherein a predetermined color representing the mark is displayed on the snapshot display.

29. The device of claim 18, wherein the device first displays the image when in video mode, displays the mark when in the snapshot mode, then returns to display the image when in the video mode.

30. The device of claim 18, wherein the detected first predetermined emission intensity of IR light at the first predetermined wavelength and the second predetermined emission intensity of IR light at the second predetermined wavelength of IR light emission is detected through a single-optical path.

31. The device of claim 18, wherein the snapshot mode detector is adapted to be positioned away from the mark by a distance of as little as six inches.

32. The device of claim 18, wherein the at least one light-sensitive compound consists of one light-sensitive compound that is adapted To emit IR light having the first predetermined emission intensity at the first predetermined emission wavelength and the second predetermined emission intensity at the second predetermined emission wavelength.

33. The device of claim 18, wherein the at least one light-sensitive compound comprises a first and a second light-sensitive compound, wherein the first light-sensitive compound is adapted to emit IR light having the first predetermined emission intensity at the first predetermined emission wavelength and wherein the second light-sensitive compound is adapted to emit IR light having the second predetermined emission intensity at the second predetermined emission wavelength.

34. The device of claim 18, wherein the mark is of any desired pattern and wherein the data is independent of the pattern of the mark.

35. The device of claim 18, in combination with a mark, the mark comprising the at least one light-sensitive compound, wherein the mark is invisible to the naked eye and wherein the mark is viewable only on the snapshot display.

36. The device of claim 18 wherein the snapshot mode detector is adapted to be positioned away from the mark by a distance of up to twelve feet.

37. A system for authenticating a mark on a substrate, the system comprising:

a mark comprising at least one light-sensitive compound that, when irradiated with IR light having a predetermined excitation wavelengths, emits IR light having a first predetermined emission intensity at a first predetermined emission wavelength in the IR range, with the predetermined emission wavelength comprising any wavelength selected from a range of wavelengths between and including peak and non-peak emission wavelengths and with the predetermined excitation wavelength being different from the predetermined emission wavelength, with the first predetermined emission intensity comprising any intensity selected from a range of intensities between and including relatively high and low emission intensities; and a detection device comprising;
a video mode comprising:
a video mode detector adapted to detect an image of at least a portion of the substrate known to include the mark; and
a video display adapted to display the image; and
a snapshot mode comprising:
an IR light source adapted to irradiate the mark, said IR light source producing IR light having the predetermined excitation wavelength in the IR range and irradiating the light-sensitive compound in the authentication mark with the IR light having the predetermined excitation wavelength so that the light-sensitive compound emits IR light having the first predetermined emission intensity at the first predetermined emission wavelength;

a filter disposed along a light path of the IR light having the first predetermined emission intensity at the first predetermined emission wavelength emitted from the light-sensitive compound, the filter allowing IR light having the first predetermined emission intensity at the first predetermined emission wavelength to pass through the filter while preventing other wavelengths of light from passing through the filter;

a snapshot mode detector comprising an IR light detector adapted to detect any IR light emission, said any IR light emission including light emission having the first predetermined emission intensity at the first predetermined on wavelength in the IR range from the light-sensitive compound in the mark after the mark has been irradiated with IR light from the IR light source, the IR light detector adapted to provide data representative of the detected first predetermined emission intensity of IR light emission from the light-sensitive compound in the mark; and a snapshot display adapted to display the data;

wherein the mark is invisible to the naked eye and wherein the mark is viewable only on the snapshot display.

38. The system of claim 37, wherein the device further comprises a storage medium adapted to store the data representative of the detected first predetermined emission intensity of IR light at the first predetermined wavelength from the light-sensitive compound in the mark.

39. The system of claim 38, wherein the storage medium comprises a storage medium capable of storing the data in a digital format.

40. The system of claim 38, wherein the storage medium comprises film.

41. The system of claim 38, further comprising at least one of a date and time stamp stored in the storage medium, the at least one of the date and time stamp representing a corresponding at least one of a date and time stamp when the device captured the mark.

42. The system of claim 37, wherein the IR light source comprises a flash.

43. The system of claim 37, wherein the device further comprises a source filter disposed within a light path of the IR light source to allow at least the predetermined excitation wavelength of IR light to irradiate the mark.

44. The system of claim 43, wherein the source filter is interchangeable such that a filter may be selected based upon the light-sensitive compound within the mark.

45. The system of claim 37, wherein the device further comprises a touch screen adapted to accept input commands to the device.

46. The system of claim 37, wherein the device further comprises a display having at least a portion thereof that includes a split screen, with the video display comprising a first half of the split screen and with the snapshot display comprising the second half of the split screen.

47. The system of claim 37, wherein a predetermined color representing the mark is displayed on the snapshot display.

48. The system of claim 37, wherein the device first displays the image when in video mode, displays the mark when in the snapshot mode, then returns to display the image when in the video mode.

49. The system of claim 37, wherein the detected first predetermined emission intensity of IR light at the first predetermined wavelength is detected through a single optical path.

50. The system of claim 37, wherein the snapshot mode detector is adapted to be positioned away from the mark by a distance of as little as six inches.

51. The device of claim 37, wherein the mark is of any desired pattern and the data is independent of the pattern of the mark.

52. The system of claim 37, wherein the at least one light-sensitive compound emits IR light having a second predetermined emission intensity at a second predetermined emission wavelength in the IR range, wherein the snapshot mode detector is adapted to detect the first predetermined emission intensity at the first predetermined wavelength and the second predetermined emission intensity at the second wavelength after the mark has been irradiated with IR light from the IR light source and wherein the data comprises a ratio of the first predetermined emission intensity to the second predetermined emission intensity or a ratio of the first predetermined emission wavelength to the second predetermined emission wavelength.

53. The system of claim 37, wherein the at least one light-sensitive compound emits IR light haying a wavelength in the IR range that is less tan or equal to about 2400 nm.

54. The system of claim 37 wherein the snapshot mode detector is adapted to be positioned away from the mark by a distance of up to twelve feet.

* * * * *